US012706873B2

(12) United States Patent
Devarajan et al.

(10) Patent No.: US 12,706,873 B2
(45) Date of Patent: Aug. 11, 2026

(54) NETWORK ADDRESS TRANSLATION IN A DISTRIBUTED SWITCH

(71) Applicant: HEWLETT PACKARD ENTERPRISE DEVELOPMENT LP, Spring, TX (US)

(72) Inventors: Venkatavaradhan Devarajan, Bangalore (IN); Balaji Sankaran, Bangalore (IN); Suresh Kumar Reddy Beeram, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 69 days.

(21) Appl. No.: 18/966,801

(22) Filed: Dec. 3, 2024

(65) Prior Publication Data

US 2026/0106856 A1 Apr. 16, 2026

(30) Foreign Application Priority Data

Oct. 11, 2024 (IN) ............................ 202441077249

(51) Int. Cl.
*H04L 61/2517* (2022.01)
*H04L 61/2546* (2022.01)
*H04L 61/5007* (2022.01)

(52) U.S. Cl.
CPC ...... *H04L 61/2517* (2013.01); *H04L 61/2546* (2013.01); *H04L 61/5007* (2022.05)

(58) Field of Classification Search
None
See application file for complete search history.

(56) References Cited

U.S. PATENT DOCUMENTS 6,993,595 B1 * 1/2006 Luptowski .......... H04L 61/2564 709/227
7,020,720 B1 * 3/2006 Donahue ................ H04L 61/50 709/245
7,653,745 B1 * 1/2010 Biswas .............. H04L 61/5014 709/224
7,912,046 B2 * 3/2011 Li ...................... H04L 61/2514 709/227
8,289,968 B1 * 10/2012 Zhuang .............. H04L 61/2517 370/252
8,422,391 B2 * 4/2013 Zhu .................... H04L 65/1023 370/252

(Continued)

*Primary Examiner* — Backhean Tiv
(74) *Attorney, Agent, or Firm* — Hewlett Packard Enterprise Patent Department

(57) ABSTRACT

A network device in a distributed switch is provided. During operation, the network device receives information indicating allocation of a public Internet Protocol (IP) address and a subset of NAT ports available for a network address translation (NAT) instance deployed in the distributed switch. The network device maintains a first set of mappings of the public IP address and the subset of the NAT ports. The network device receives a packet destined to a public IP address and a first NAT port based on a forwarding rule. The network device replaces, using the NAT instance, the public IP address with a first private IP address of a user device and the first NAT port with a first protocol port in the packet based on a first mapping in the first set of mappings. The network device forwards the packet to the user device using the first private IP address.

20 Claims, 13 Drawing Sheets

(56) References Cited

U.S. PATENT DOCUMENTS

| | | | | |
|---|---|---|---|---|
| 8,788,709 | B1 * | 7/2014 | Ong | H04L 61/2521 709/202 |
| 8,812,730 | B2 * | 8/2014 | Vos | H04L 61/2582 709/245 |
| 9,178,846 | B1 * | 11/2015 | Kamisetty | H04L 63/02 |
| 10,243,920 | B1 * | 3/2019 | Dickinson | H04L 45/74 |
| 10,412,004 | B2 * | 9/2019 | Ong | H04L 69/22 |
| 11,483,278 | B1 * | 10/2022 | Lifshitz | H04L 61/10 |
| 12,021,825 | B2 * | 6/2024 | Kraiser | H04L 61/256 |
| 2004/0017818 | A1 * | 1/2004 | Chung | H04L 61/2575 370/466 |
| 2005/0053063 | A1 * | 3/2005 | Madhavan | H04L 61/2514 709/245 |
| 2005/0117588 | A1 * | 6/2005 | Tseng | H04L 61/2514 370/395.31 |
| 2009/0092132 | A1 * | 4/2009 | Fartmann | H04L 61/2528 370/389 |
| 2014/0204947 | A1 * | 7/2014 | Krishnan | H04L 61/2514 370/392 |
| 2022/0021646 | A1 * | 1/2022 | Joshi | H04L 67/1001 |
| 2023/0336529 | A1 * | 10/2023 | Nagrockas | H04L 61/2539 |
| 2024/0276301 | A1 * | 8/2024 | Zhu | H04L 61/2514 |

* cited by examiner

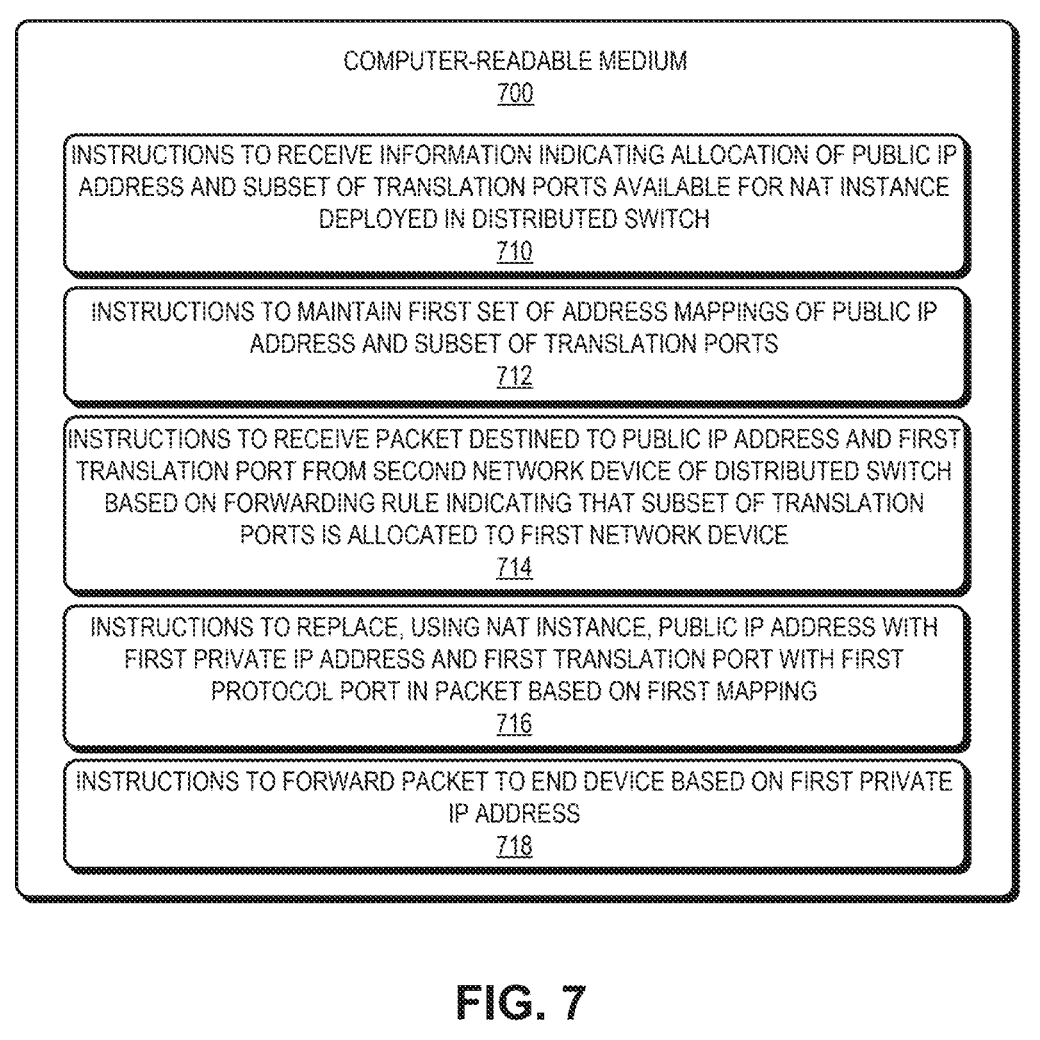

COMPUTER-READABLE MEDIUM
700

INSTRUCTIONS TO RECEIVE INFORMATION INDICATING ALLOCATION OF PUBLIC IP ADDRESS AND SUBSET OF TRANSLATION PORTS AVAILABLE FOR NAT INSTANCE DEPLOYED IN DISTRIBUTED SWITCH
710

INSTRUCTIONS TO MAINTAIN FIRST SET OF ADDRESS MAPPINGS OF PUBLIC IP ADDRESS AND SUBSET OF TRANSLATION PORTS
712

INSTRUCTIONS TO RECEIVE PACKET DESTINED TO PUBLIC IP ADDRESS AND FIRST TRANSLATION PORT FROM SECOND NETWORK DEVICE OF DISTRIBUTED SWITCH BASED ON FORWARDING RULE INDICATING THAT SUBSET OF TRANSLATION PORTS IS ALLOCATED TO FIRST NETWORK DEVICE
714

INSTRUCTIONS TO REPLACE, USING NAT INSTANCE, PUBLIC IP ADDRESS WITH FIRST PRIVATE IP ADDRESS AND FIRST TRANSLATION PORT WITH FIRST PROTOCOL PORT IN PACKET BASED ON FIRST MAPPING
716

INSTRUCTIONS TO FORWARD PACKET TO END DEVICE BASED ON FIRST PRIVATE IP ADDRESS
718

FIG. 7

NETWORK ADDRESS TRANSLATION IN A DISTRIBUTED SWITCH

BACKGROUND

A network device, such as a switch, may be deployed in different network topologies. For example, the network device can be deployed in a distributed switch, which can include a plurality of network devices operating as a single switch.

BRIEF DESCRIPTION OF THE FIGURES

FIG. 7 illustrates an example of a computer-readable medium (CRM) facilitating efficient address translation associated with a NAT deployment in a distributed switch, in accordance with an aspect of the present application.

In the figures, like reference numerals refer to the same figure elements.

DETAILED DESCRIPTION

Figure 1A:
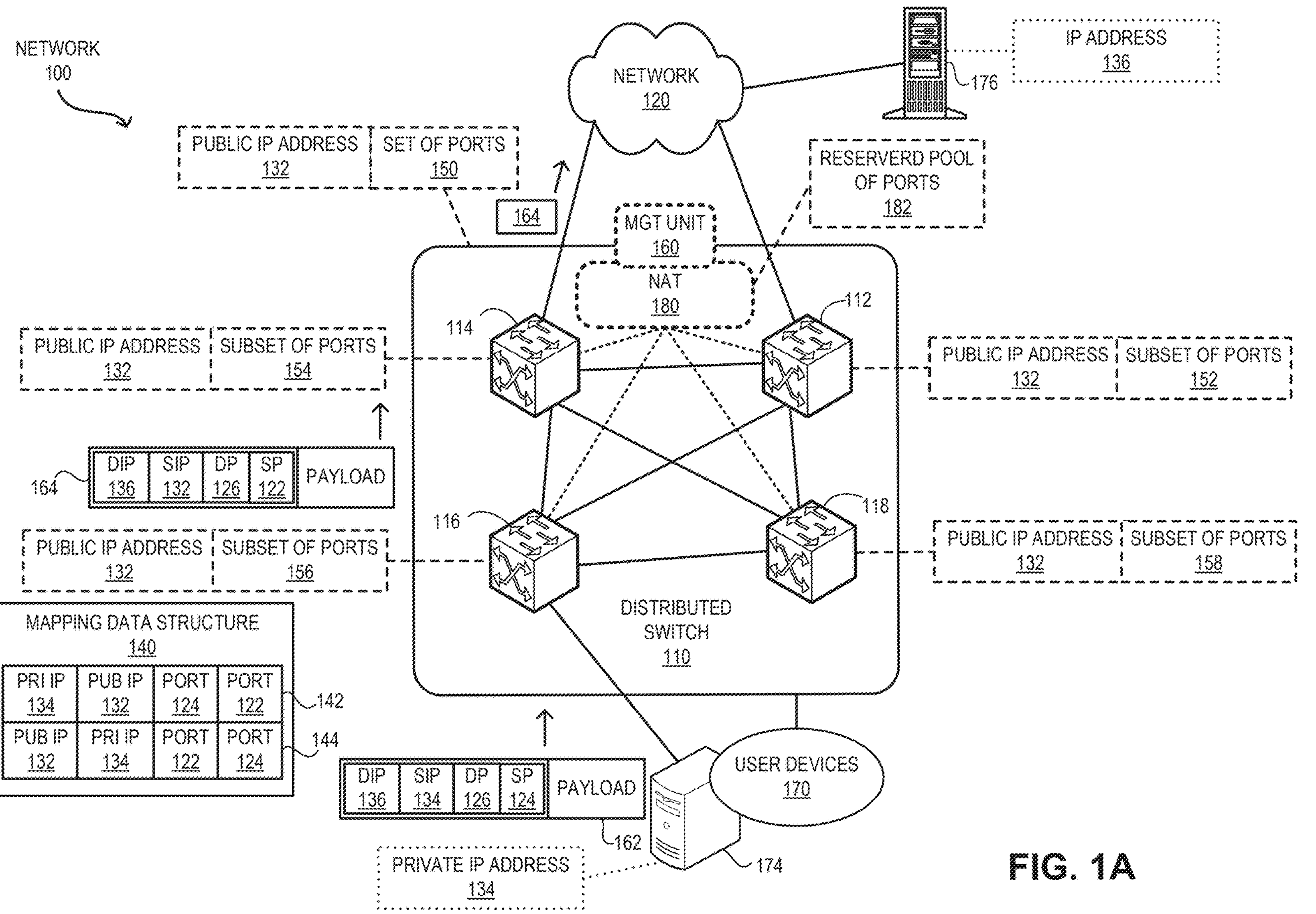
FIG. 1A illustrates an example of efficient upstream address translation associated with a network address translation (NAT) deployment in a distributed switch, in accordance with an aspect of the present application.

The volume of traffic generated by various applications on user devices continues to increase. To efficiently forward and manage the traffic in a network, the network devices can be equipped with versatile capabilities, such as scalability and high availability. Ideally, the network is expected to accommodate traffic from an increasing number of user devices even during a failure scenario. A distributed switch can facilitate scalable bandwidth and high availability to the user devices. The distributed switch can be formed and operated using network virtualization technologies, such as switch stacking, which allows a plurality of inter-connected network devices to operate as a distributed switch (e.g., a virtual switch) with a unified control plane. An example of a distributed switch formed using switch stacking is a virtual switch framework (VSF) stack. The unified control plane can be a single control plane shared among the network devices of the distributed switch, enhancing overall network performance and reliability.

Typically, the distributed switch may couple a large number of user devices (e.g., hosts and servers) to an external network, such as the Internet. As a result, the distributed switch can be the initial hop for packets sent from the user devices. However, allocating individual public or global Internet Protocol (IP) addresses to these user devices can strain the limited global IP address space. Instead of allocating a public IP address, the user devices can be allocated with respective private IP addresses, which are not used for forwarding packets in the public Internet. Therefore, the user devices can be in a private network that may not be directly accessible based on the private IP addresses. To allow user devices in the private network to be reached from the public Internet, their private IP addresses are usually mapped to a public IP address, which is used to represent the private network.

A network address translation (NAT) instance can be deployed on the distributed system (i.e., deployed on a respective network device of the distributed switch) to facilitate the translation between the public IP address and the private IP addresses. The translation process can include changing or replacing the private IP address and a protocol port (e.g., a Transmission Control Protocol (TCP) port) of a packet to the public IP address and a NAT port, respectively. The translation process can generate a translated packet with the changed IP address and port. The NAT port can be a port selected from a range of ports reserved for NAT. The NAT instance maintains a mapping (e.g., a NAT mapping) between the tuple [private IP address, protocol port] and the tuple [public IP address, NAT port]. Since a respective tuple [private IP address, protocol port] can correspond to a unique NAT port, this NAT port can be used to identify the private IP address and its associated protocol port. Accordingly, the NAT instance can facilitate the translation based on the mapping.

The aspects described herein address the problem of efficiently deploying a NAT instance in a distributed switch by (i) dividing the NAT ports of the NAT instance into non-overlapping subsets and allocating a respective subset to a corresponding network device; and (ii) maintaining a forwarding policy indicating which network device is associated with which subset of NAT ports. As a result, a respective network device can maintain the NAT mappings associated with the NAT ports allocated to that network device. When another network device of the distributed switch receives a packet requiring NAT translation, that other network device can forward the packet to the network device maintaining the NAT mappings corresponding to the NAT translation. In this way, the NAT mappings can be stored in different network devices of the distributed switch, which can facilitate efficient deployment of the NAT instance in the distributed switch Currently, a distributed switch can include multiple physical network devices, each with its own processing and switching hardware, operating as a single logical switch, such as a switch stack (e.g., a VSF stack). The network devices in a distributed switch can be individual physical network devices or networking units (e.g., switching units, such as switch blades) within a chassis. When a NAT instance is deployed in the distributed switch, the NAT instance can be deployed on a respective network device of the distributed switch. The NAT instance can perform an address translation, which can change a private IP address with a public address and a protocol port (e.g., a TCP port) with a NAT port in a packet comprising the private IP address.

During operation, when a network device in the distributed switch receives an initial packet with the private IP address as a source address from a user device, the NAT instance of the network device can detect the private IP address and a protocol port (e.g., a TCP port). The NAT instance can be a software instance, a hardware instance, or a combination thereof. When the private IP address is initially detected in a packet at the forwarding hardware of the network device, the forwarding hardware may not detect a corresponding NAT mapping. The forwarding hardware can then provide the private IP address to the NAT daemon corresponding to the NAT instance. The NAT daemon can be a software entity executing on a processing resource of the network device. The NAT instance (e.g., at the NAT daemon) can then allocate the public IP address and a NAT port to the private IP address and generate corresponding NAT mappings between them. The NAT port can be a port in a set of ports dedicated for the NAT instance. These ports can be included in a layer-4 header (e.g., a TCP header). The NAT mappings can be programmed in the forwarding hardware (the application-specific integrated circuit (ASIC)) of the network device. As a result, when a packet matching one of the NAT mappings is received by the network device, the network device can perform address translation on the packet based on the matched NAT mapping and generate a translated packet. The NAT mappings can include a forward translation mapping (or forward mapping) that corresponds to the address translation when the private IP address is a source address (i.e., for packets from the user device). The NAT mappings can also include a reverse translation mapping (or reverse mapping) that corresponds to the address translation when the public IP address is a destination address (i.e., for packets destined to the user device).

The forward mapping can map the tuple [private IP address, protocol port] to the tuple [public IP address, NAT port]. The reverse mapping can map the tuple [public IP address, NAT port] to the tuple [private IP address, protocol port]. The NAT instance can then perform address translation on the subsequent packets received from the user device by replacing the private IP address with the public IP address, and the protocol port with the NAT port. If the NAT instance is deployed in the software, the subsequent packets are also provided to the NAT daemon (i.e., to the processor of the network device), which can then perform the address translation. The NAT instance can also span both software and hardware. The NAT mappings can then be maintained in the forwarding hardware of the switch (e.g., in the Ternary content-addressable memory (TCAM). The forwarding hardware can then perform the address translation on the subsequent packets. Here, the components of the forwarding hardware performing the NAT translations can represent the NAT instance in the forwarding hardware. Similarly, the NAT instance, either in hardware or in software, can perform reverse address translation on the packets destined to the user device replacing the public IP address with the private IP address and the NAT port with the protocol port. Here, the NAT instance can determine the private IP address based on the NAT port in these packets. In either instance, the network device, using its NAT instance, can perform the NAT translation.

The NAT instance performing the address translation for a particular private IP address can be referred to as a NAT session, which encompasses a respective packet with the private IP address. The corresponding NAT mappings associated with a NAT session should be consistent across the distributed switch because the traffic destined to the public IP address can arrive at any of the network devices of the distributed switch. The receiving network device may need to determine how to forward the packet to the corresponding user device. To determine the user device, the network device may need to perform the address translation. As a result, a respective network device may need to maintain the NAT mappings for the entire distributed switch. However, some network devices may not receive traffic associated with a particular private address. Therefore, maintaining the NAT mappings at a respective network device can consume the limited hardware resources, which are not used for actual traffic forwarding on these network devices.

To address this issue, the set of NAT ports available to the NAT instance deployed on the distributed switch can be divided into a number of subsets (e.g., non-overlapping subsets), and a respective network device can be responsible for maintaining the NAT mappings of a corresponding subset. To facilitate the allocation of the NAT ports, the distributed switch can include a management unit, which can be implemented using software, hardware, or a combination thereof. The management unit can be deployed on a management device (e.g., a network orchestrator) that can provision and configure a respective network device of the distributed switch. The management unit may also be deployed on a respective network device of the distributed switch. The management unit can then be incorporated into the NAT daemon of the network device.

When a network device detects a user device coupled to its ports, the network device can determine the device type, which can be an end device (e.g., a personal computer or a server) or a client network device (e.g., a client switch). If the user device is a client switch, it may couple to a set of additional devices. The network device can then provide information associated with the user devices to the management unit. The management unit can then determine the expected number of NAT sessions a network device may need to initiate and maintain. Based on the ratio of the expected number of NAT sessions, the management unit can divide the set of NAT ports into subsets and allocate a respective subset to a corresponding network device. If there are X network devices in the distributed switch, the management unit can divide the NAT ports into X subsets and allocate each to a corresponding network device.

Since a respective subset of NAT ports is allocated to a particular network device, the NAT mappings associated with the subset of NAT ports can be generated and maintained at that network device. The NAT mappings can be programmed in the forwarding hardware of the network device, thereby spanning the NAT instance to the forwarding hardware. When a user device sends a packet to the network device, the network device can allocate a NAT port from its subset for the tuple [private IP address, protocol port] in the packet and generate the corresponding NAT mappings. The network device can then perform a forward translation on the packet to generate a translated packet and forward the translated packet to the destination IP address.

To support address translations in the reserve direction based on these NAT mappings, a respective network device can be programmed with a forwarding policy indicating the subset of NAT ports and the corresponding target network device. Therefore, the target network device can be associated with the NAT ports and maintain the NAT mappings with the NAT ports. Any other network device of the distributed switch can receive a packet destined to the public IP address and the NAT port. The other network device can then forward the packet to the network device (i.e., within the distributed switch) based on the forwarding policy. Accordingly, the packet is forwarded to the network device maintaining the NAT mappings associated with the NAT port. Upon receiving the packet, the target network device can perform a reverse translation on the packet to generate a reverse-translated packet and send the reverse-translated packet to its destination.

After the initial distribution of the NAT ports, the distribution of user devices may change. For example, a network device may couple to more user devices than initially estimated. Since a NAT port is allocated to the private IP address of a respective user device, the subset of NAT ports associated with the network device may become close to exhaustion. If the number of allocated NAT ports in the subset reaches a threshold (e.g., 80% of the number of NAT ports in the subset), the network device may need more NAT ports. To allocate more NAT ports to a particular network device, the management unit may reserve a pool of NAT ports that are not divided into the subsets. The reserved pool of NAT ports can initially remain unallocated. The management unit can determine a portion of the reserved pool of NAT ports based on the updated number of user devices associated with the network devices. The management unit can then incorporate the portion of the reserved pool of NAT ports to the subset of ports that has reached the threshold, thereby increasing the number of NAT ports in the subset.

Furthermore, at least two network devices of the distributed switch can be coupled with a user device over an MC-LAG. In other words, the user device can be coupled to at least two peer network devices over the MC-LAG. The user device can be coupled to the peer network devices via respective links. These links can be grouped together to operate as a logical or virtual link, which is represented by the MC-LAG. The peer network devices can exchange traffic with the user device via the MC-LAG. To send a packet, the user device can use the header information of the packet and select one of the peer network devices for forwarding packets. For example, the user device may apply a hash function to the IP addresses of the packets to select the network device. The network device can then allocate a NAT port for the private IP address of the user device and maintain the corresponding NAT mappings. Since the hash function may select the same network device for a respective packet of the same data flow (e.g., packets between the same IP address pair), subsequent packets can be sent to the network device. Upon receiving the packets, the network device can perform forward translation on the packets and forward them.

In the reverse direction, when another network device receives a packet destined to the user device, the other network device can typically apply a load-balancing mechanism (e.g., round-robin selection) to select one of the peer network devices for forwarding the packet. To ensure packet forwarding to the target network device that maintains the NAT mappings associated with the user device, the other network device may bypass the load-balancing mechanism and forward the packet based on the forwarding policy, which can cause the packet to be forwarded to the target network device storing the corresponding NAT mappings. The target network device can receive the packet, perform reverse address translation on the packet, and forward the packet via its link in the MC-LAG.

Moreover, to ensure high availability between the peer network devices, the target network device can synchronize the NAT mappings with the peer network devices. However, instead of programming the NAT mappings in the forwarding hardware, the peer network device can cache the NAT mappings in its memory without using the limited resources of the forwarding hardware. If a link in the MC-LAG becomes unavailable, a packet from the user device can be received via the active link of the MC-LAG by the peer network device. Upon receiving the packet, the forwarding hardware of the peer network device may not detect the NAT mappings matching the private IP address in the packet (i.e., the NAT mappings with the corresponding NAT port). The peer network device can then obtain the forward mapping associated with the private IP address from its memory and program the forward mapping in the forwarding hardware.

In the reverse direction, the other network devices of the distributed switch can receive packets from the external network and can continue to forward the packets to the target network device associated with the NAT port based on the forwarding policy. As a result, the target network device can receive a packet from another network device of the distributed switch. Since the target network device remains operational, it can receive the packet, perform the reverse translation on the packet, and forward the packet to the peer network device, which is coupled to the active link of the MC-LAG. In turn, the peer network device can forward the packet to the user device via the active link in the MC-LAG.

However, if the target network device associated with the NAT port becomes unavailable, it can no longer perform forward or reverse address translation. The peer network device can detect the unavailability, obtain the forward and reverse mappings from its memory, and program them in its forwarding hardware. As a result, the peer network device can perform forward translation on the packets from the user device received via the active link of the MC-LAG. Furthermore, the forwarding policy can indicate the peer network device as a standby device for the subset of NAT ports allocated to the unavailable network device. Consequently, upon detecting the unavailability of the network device, the other network devices in the distributed switch can check the forwarding policy and identify the corresponding standby device. The other network devices can then determine the peer network device as the target network device associated with the subset of NAT ports. Accordingly, in the reverse direction, the other network devices can forward a packet to the peer network device, which is not the target network device. The peer network device can receive the packet, perform the reverse translation on the packet, and forward the packet to the user device via the active link in the MC-LAG.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of efficient upstream address translation associated with a NAT deployment in a distributed switch, in accordance with an aspect of the present application. A network 100 can include a number of network devices (e.g., switches), and may include network devices, such as layer-2 and layer-3 hops, and tunnels. In some examples, network 100 can be an Ethernet network, InfiniBand network, or other network, and may use a corresponding communication protocol, such as IP, FibreChannel over Ethernet (FCoE), or other protocols. Network 100 can include network devices 112, 114, 116, and 118. These network devices can be individual physical network devices or networking units (e.g., switching units, such as switch blades) within a chassis. A respective network device in network 100 can be assigned a MAC address and an IP address and can include at least one processing resource. Examples of a processing resource can include, but are not limited to, a processor core, a graphics processing unit (GPU), and a tensor processing unit (TPU). The network device can also include at least one non-transitory computer-readable medium storing instructions that when executed by the processing resource to perform one or more operations. The network device can further include forwarding hardware (e.g., the ASIC of the network device, which can at least incorporate a TCAM).

In this example, network devices 112, 114, 116, and 118 can form a distributed switch 110 based on network virtualization technology. If the network virtualization technology is switch stacking, distributed switch 110 can be a switch stack (e.g., a VSF stack). Distributed switch 110 can be coupled to an external network 120, which can be a Wide Area Network (WAN), such as the Internet, via network devices 112 and 114. Distributed switch 110 may couple a large number of user devices 170 (e.g., hosts and servers) to external network 120. As a result, distributed switch 110 can be the initial hop for packets sent from user devices 170. However, allocating individual public or global IP addresses to user devices 170 can strain the limited global IP address space. Instead of allocating a public IP address, each of user devices 170 can be allocated with a private IP address, which may not be used to forward packets in network 120. Therefore, user devices 170 can be in a private network that may not be directly accessible based on the private IP addresses. To allow packet forwarding, these private IP addresses can be mapped to a public IP address, which is used to represent the private network.

A NAT instance 180 can be deployed on distributed system 110 to facilitate the translation between the public IP address and the private IP addresses of user devices 170. Deploying NAT instance 180 can include deploying it on a respective network device of distributed switch 110. Deploying NAT instance 180 on the network device can include running a NAT daemon on the network device. The NAT daemon can be a software entity executing on the processor of the network device. NAT instance 180, at the NAT daemon, can allocate a NAT port from a set of NAT ports 150 to a corresponding private IP address. NAT ports 150 can indicate a range of NAT ports available to NAT instance 180. This range of NAT ports may not be used by any other protocols, such as TCP. NAT instance 180, at the forwarding hardware of the network device, can perform an address translation, which can change a private IP address with public address 132 and a protocol port (e.g., a TCP port) with a NAT port in a packet comprising the private IP address.

During operation, to initiate communication with a device 176 reachable via external network 120, a user device 174 can send an initial packet. The source and destination IP addresses of the packet can be IP addresses 134 and 136 of devices 174 and 176, respectively. The source and destination protocol ports (e.g., TCP ports) of the packet can be ports 124 and 126, respectively. Here, IP address 134 can be a private IP address. When network device 116 can detect IP address 134, NAT instance 180 of network device 116 can generate NAT mappings between the tuple [private IP address 134, protocol port 124] and the tuple [public IP address 132, a NAT port]. Here, the NAT port can be from NAT ports 150 and can uniquely correspond to private IP address 134. NAT instance 180 can then perform address translation on the packets from user device 174 by replacing the private IP address 134 with public IP address 132, and protocol port 124 with the NAT port. Similarly, the NAT instance can perform reverse address translation on the packets destined to the user device by replacing public IP address 132 with private IP address 134 and the NAT port with protocol port 124.

NAT instance 180 performing the address translations for a particular IP address, such as IP address 134, can be a NAT session, which can encompass the address translation for a respective packet with IP address 134. The NAT mappings associated with the NAT session should be consistent across distributed switch 110 because the traffic destined to public IP address 132 can arrive at network device 112 or 114 of distributed switch 110. Suppose that network device 112 receives the packet. Network device 112 may then need to determine how to forward the packet to user device 174. To identify user device 174, network device 116 may need to perform the address translation. As a result, a respective network device may need to maintain the NAT mappings for the entire distributed switch 110. However, some network devices in distributed switch 110 may not receive traffic associated with IP address 134. Hence, maintaining the NAT mappings for all private addresses at a respective network device can consume the limited hardware resources, which are not used for actual traffic forwarding on these network devices.

To address this issue, NAT ports 150 available to NAT instance 180 can be divided into subsets 152, 154, 156, and 158, each corresponding to a network device in distributed switch 110. To facilitate the allocation of NAT ports 150, distributed switch 110 can include a management unit 160. Management unit 160 can be implemented using software, hardware, or a combination thereof. Management unit 160 can be deployed on a management device (e.g., a network orchestrator not shown in FIG. 1A) that can provision and configure a respective network device in distributed switch 110. Management unit 160 may also be deployed on a respective network device of distributed switch 110. For example, management unit 160 can be deployed with NAT instance 180 (e.g., incorporated into the NAT daemon) on a respective network device. Management unit 160 can determine the ratio of the expected number of user devices associated with network devices 112, 114, 116, and 118. Subsequently, management unit 160 can divide NAT ports 150 into subsets 152, 154, 156, and 158 and allocate them to network devices 112, 114, 116, and 118, respectively. Therefore, network devices 112, 114, 116, and 118 can be responsible for maintaining the NAT mappings of subsets 152, 154, 156, and 158, respectively.

Typically, when network device 116 detects user device 174 (e.g., from a port of network device 116), network device 116 can determine the type of user device 174. For example, network device 116 can determine whether user device 174 is an end device (e.g., a personal computer or a server) or a client network device (e.g., a client switch). If user device 174 is a client switch, it may couple a set of user devices. Network device 116 can then provide information associated with user devices 174 to management unit 160. In this way, a respective network device in distributed switch 110 can provide information associated with the user devices coupled to the network device. Based on the number of user devices and their respective type, management unit 116 can determine the expected number of NAT sessions a network device may need to initiate and maintain. Based on the ratio of the expected number of NAT sessions, management unit 116 can divide NAT ports 150 into subsets 152, 154, 156, and 158.

These subsets can be non-overlapping subsets, and hence, can be unique to the network device associated with the subset. If a network device couples more user devices than initially determined, the subset associated with the network device may need more NAT ports (i.e., the subset may need to be expanded). To allocate more NAT ports to the network device, management unit 160 may reserve a pool of NAT ports 182 that are not placed into subsets 152, 154, 156, and 158. A respective subset may be represented by a range of ports. For example, if NAT ports 150 include the range of ports 16385-65535, subset 152 can include ports in the range 16385-24476, subset 154 can include ports in the range 24477-32668, subset 156 can include ports in the range 32669-40760, and subset 158 can include ports in the range 40761-48952. Reserved pool of NAT ports 182 can then include ports in the range 48953-65535.

Since subset 156 is allocated to network device 116, the NAT mappings associated with subset 156 can be generated and maintained at network device 116. The NAT mappings can be maintained in a mapping data structure (MDS) 140. MDS 140 can be programmed in the forwarding hardware of network device 116 (e.g., the ASIC of network device 116. For example, MDS 140 can be stored in the TCAM of network device 116. As a result, when a packet matching one of the NAT mappings in MDS 140 is received by network device 116, network device 116 can perform address translation based on the matched NAT mapping.

During operation, when network device 116 receives packet 162 with private IP address 134 as the source address from user device 174, NAT instance 160 of network device 116 can detect IP address 134 as a private IP address based on the predetermined range of IP addresses reserved as "private." NAT instance 160 can also detect protocol port 124 as the source protocol port. NAT instance 160 can then allocate NAT port 122 from subset 156 to IP address 134 and generate corresponding NAT mappings between them. Here, NAT port 122 can be uniquely allocated to IP address 134. As a result, when network device 116 receives a packet with NAT port 122, the NAT mappings matching NAT port 122 can indicate IP address 134.

For example, for IP address 134, MDS 140 can include a forward mapping 142 that corresponds to the address translation when IP address 134 is a source address (i.e., for packets from user device 174). Forward mapping 142 can map the tuple [IP address 134, protocol port 124] to the tuple [public IP address 132, NAT port 122]. MDS 140 can also include a reverse mapping 144 that corresponds to the address translation when IP address 132 is a destination address and NAT port 122 is the destination port (i.e., for packets destined to user device 174). Reverse mapping 144 can map the tuple [public IP address 132, NAT port 122] to the tuple [IP address 134, protocol port 124]. When the forwarding hardware of network device 116 receives a packet, it can perform a lookup using the IP addresses and ports in the header of the packet on MDS 140 (e.g., in the TCAM). If a match is found, NAT instance 160, using the forwarding hardware, can perform the address translation on the packet.

Upon receiving packet 162, the forwarding hardware of network device 116 can look up the IP addresses and ports of packet 162 in MDS 140. IP address 134 and port 124 can match NAT mapping 142 in MDS 140. NAT mapping 142 can indicate that IP address 134 corresponds to IP address 132, and protocol port 124 corresponds to NAT port 122. Accordingly, NAT instance 160, using the forwarding hardware, can perform forward address translation on packet 162 by replacing IP address 134 with IP address 132, and protocol port 124 with NAT port 122. For example, the ASIC of network device 116 can find a match in MDS 140 in the TCAM and perform the address translation. In this way, network device 116 can generate translated packet 164 that can include IP address 132 as the source address and NAT port 122 as the source port. Network device 116 can then forward packet 164 to network device 114, which can then forward packet 164 to device 176 via network 120. In this way, NAT instance 160 can be efficiently deployed on distributed switch 110 by dividing NAT ports 150 among the network devices of distributed switch 110 and maintaining the NAT mappings at the corresponding network devices.

Figure 1B:
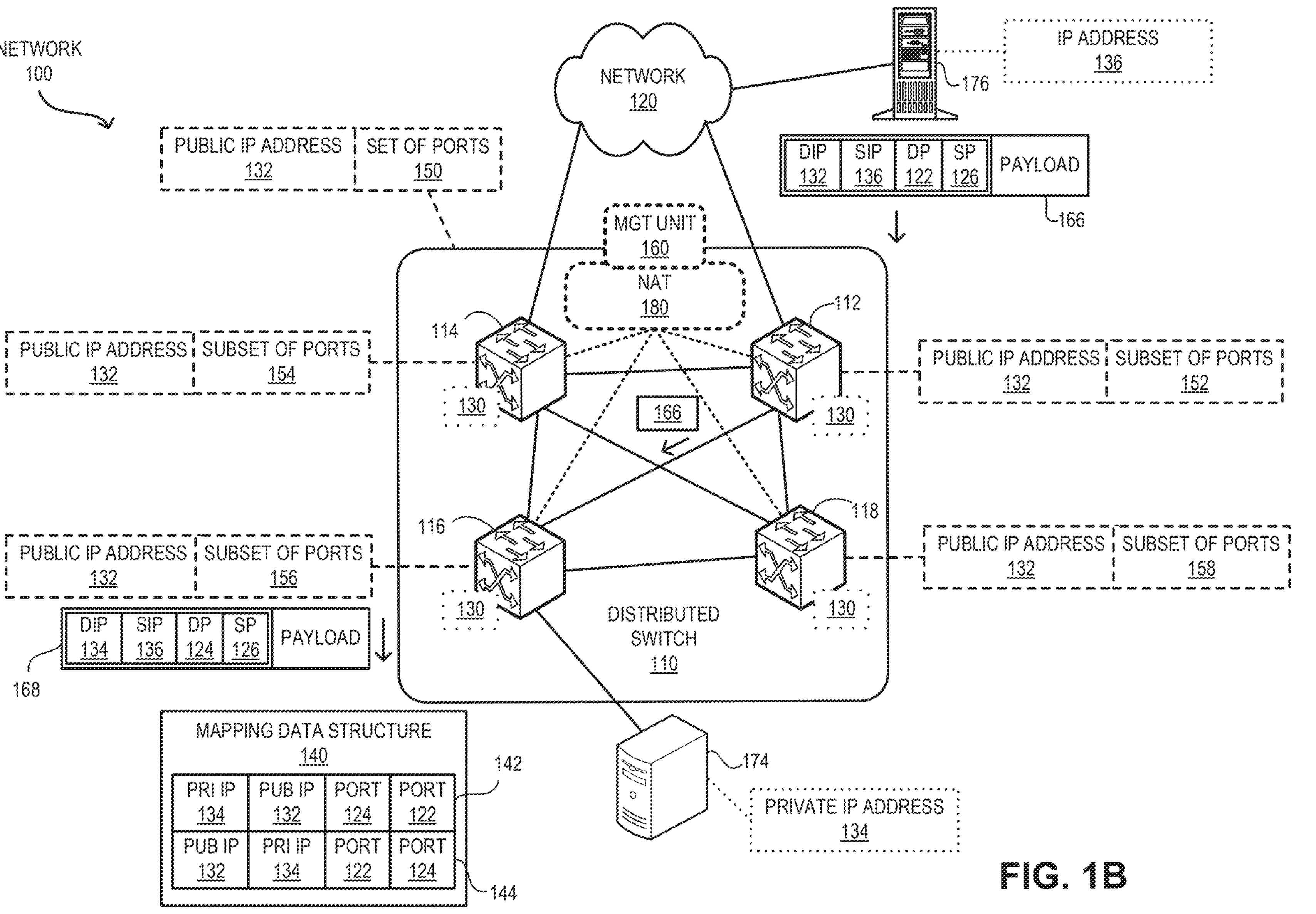
FIG. 1B illustrates an example of efficient downstream address translation associated with a NAT deployment in a distributed switch, in accordance with an aspect of the present application.

FIG. 1B illustrates an example of efficient downstream address translation associated with a NAT deployment in a distributed switch, in accordance with an aspect of the present application. When device 176 receives packets (e.g., packet 164 of FIG. 1A) from user device 174, the packets can include IP address 132 as the source address and NAT port 122 as the source port. Therefore, to send a packet 166 to user device 174, device 176 can include IP address 132 as the destination address and NAT port 122 as the destination port. Here, IP address 132 can be a public IP address associated with NAT instance 180. Therefore, IP address 132 can be associated with distributed switch 110. Accordingly, packet 166 can be forwarded to distributed switch 110 via network 120. Since network devices 112 and 114 are coupled to network 120, packet 166 can be received by network device 112 or 114. Suppose that network device 112 receives packet 166 via network 120.

However, NAT port 122 can be associated with network device 116 because NAT port 122 can be from subset 156. Hence, NAT mappings 142 and 144 for NAT port 122 can be maintained at network device 116. To support address translations in the reserve direction based on NAT mappings 142 and 144, a respective network device in distributed switch 110 can be programmed with a forwarding policy 130 indicating the subset of NAT ports and the corresponding network device. For example, forwarding policy 130 can indicate that subsets 152, 154, 156, and 158 correspond to network devices 112, 114, 116, and 118, respectively. In forwarding policy 130, subsets 152, 154, 156, and 158 may be represented by their corresponding range of NAT ports.

Based on forwarding policy 130, network device 112 can determine that NAT port 122 is in subset 154, which is associated with network device 116. Hence, network device 112 can forward packet 166 to network device 116. In some examples, forwarding policy 130 can be programmed in the respective forwarding hardware of network devices 112, 114, 116, and 118. As a result, upon receiving packet 166, the forwarding hardware of network device 112 can determine that packet 166 should be forwarded to network device 116 and forward packet 166 to network device 116. When network device 116 receives packet 166, the forwarding hardware of network device 116 can look up the IP addresses and ports of packet 166 in MDS 140.

During the lookup, IP address 132 and port 122 can match NAT mapping 144 in MDS 140. NAT mapping 144 can indicate that IP address 132 corresponds to IP address 134, and NAT port 122 corresponds to protocol port 124. Accordingly, NAT instance 160, using the forwarding hardware, can perform reverse address translation on packet 166 by replacing IP address 132 with IP address 134, and NAT port 122 with protocol port 124. In this way, network device 116 can generate reverse-translated packet 168 that can include IP address 134 as the destination address and protocol port 124 as the destination port. Network device 116 can then forward packet 168 to user device 174 based on IP address 134. In this way, even when NAT mappings 142 and 144 are maintained at network device 116, network device 112 can forward packet 166 to network device 116 based on forwarding policy 130. As a result, a respective network device of distributed switch 110 can be associated with a subset of NAT ports and perform reverse address translation, thereby efficiently deploying NAT instance 160.

Figure 1C:
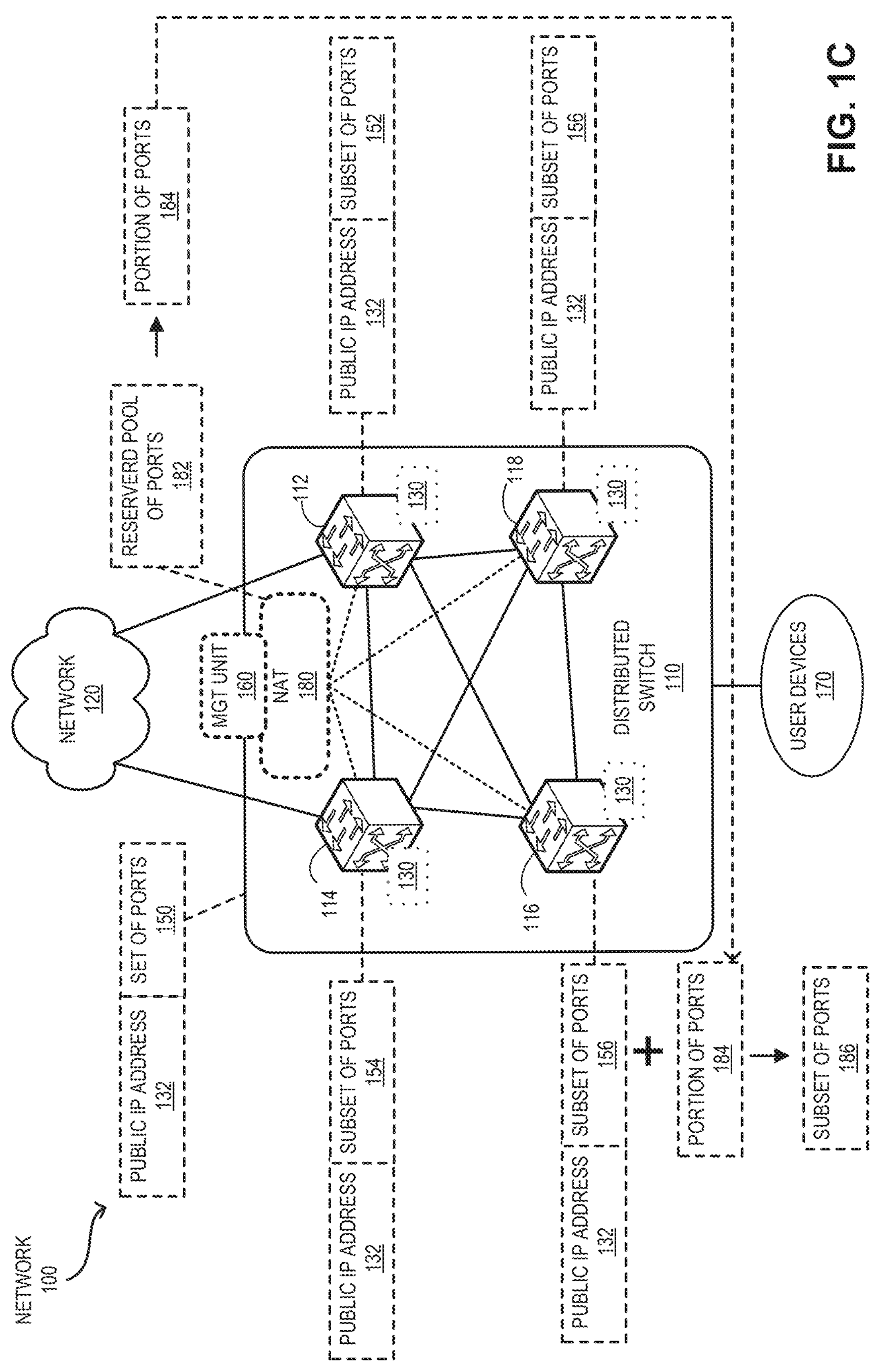
FIG. 1C illustrates an example of the reallocation of NAT ports associated with a NAT deployment in a distributed switch, in accordance with an aspect of the present application.

FIG. 1C illustrates an example of the reallocation of NAT ports associated with a NAT deployment in a distributed switch, in accordance with an aspect of the present application. After the initial distribution of NAT ports 150, the distribution of user devices 170 may change. For example, a new client switch can be coupled to network device 116. The client switch may couple a number of user devices. As a result, network device 116 may be couple to more user devices than initially estimated. NAT instance 180 can allocate a NAT port to the private IP address of a respective user device. As a result, if the number of user devices coupled to network device 116 increases, the number of NAT ports allocated from subset 156 can also increase. Consequently, most NAT ports of subset 156 may become allocated. If the number of allocated NAT ports in subset 156 reaches a threshold (e.g., 80% of the number of NAT ports in subset 156), network device 116 may need more NAT ports to accommodate more user devices.

To allocate more NAT ports to network device 116, management unit 160 can reserve pool of NAT ports 182 that are not divided into subsets 152, 154, 156, and 158. When subset 156 needs more NAT ports, management unit 160 can determine the current ratio of the respective number of user devices coupled to network devices 112, 114, 116, and 118. Based on the ratio, management unit 160 can determine a portion 184 of reserved pool of NAT ports 182. Management unit 160 can then incorporate portion 184 to subset 156 and generate a new subset of ports 186. Here, subset 186 can include the NAT ports subset 156 and portion 184. In this way, management unit 160 can allocate subset 186 to network device 116 with an increased number of NAT ports.

Management module 160 can also update forwarding policy 130 on a respective network device to indicate that subset 186 is associated with network device 116. In particular, portion 184 can be represented by a range of NAT ports. Therefore, subset 186 can be represented by two ranges of NAT ports, which can include a range associated with subset 156 and a range associated with portion 186. When network device 116 determines that forwarding policy 130 on network device 116 has been updated, network device 116 may determine that forwarding policy 130 has been updated to indicate subset 186 for network device 116. Network device 116 can then allocate NAT ports from portion 184.

Figure 2A:
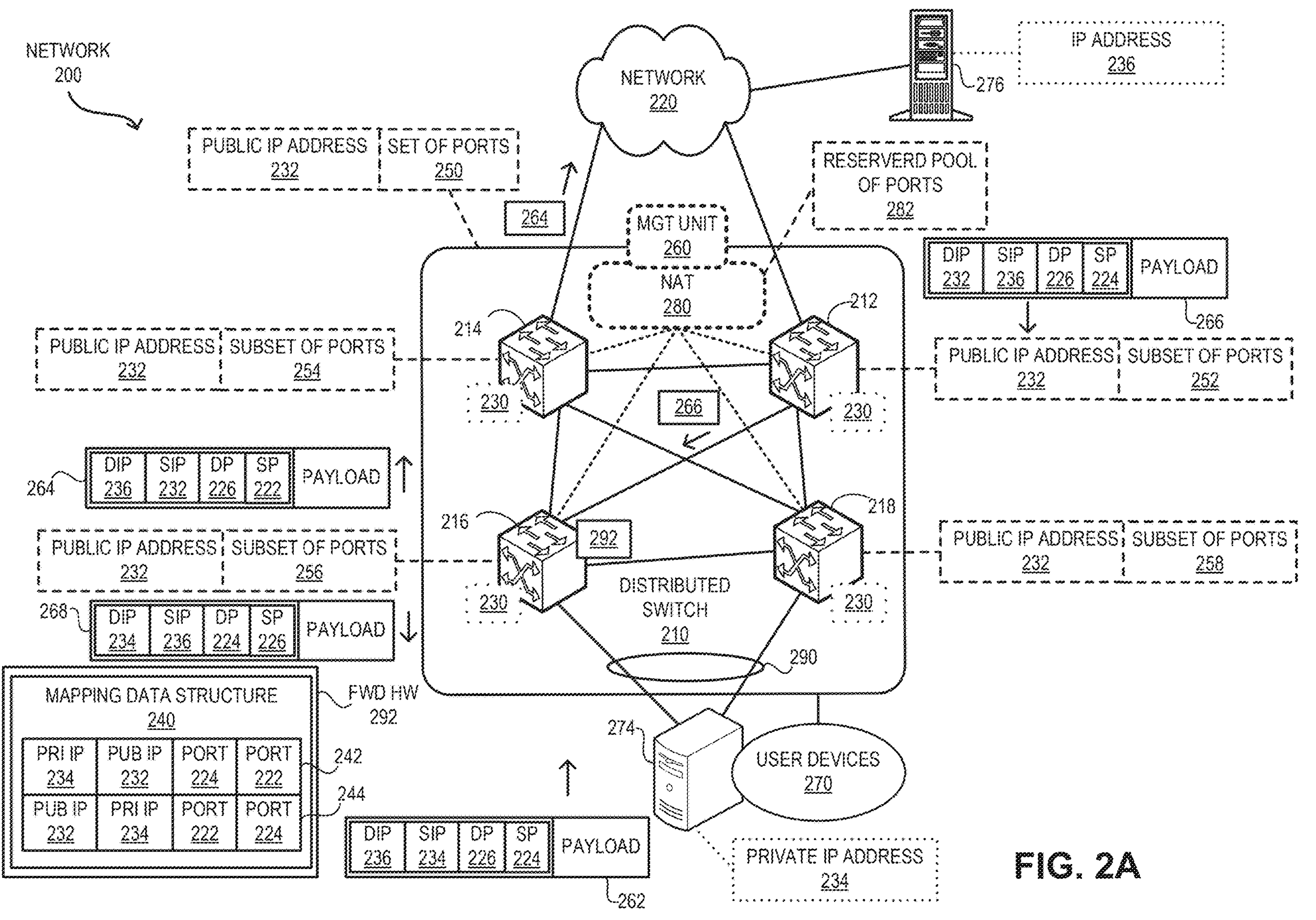
FIG. 2A illustrates an example of efficient address translation associated with a NAT deployment in a multi-chassis link aggregation group (MC-LAG) of a distributed switch, in accordance with an aspect of the present application.

FIG. 2A illustrates an example of efficient address translation associated with a NAT deployment in an MC-LAG of a distributed switch, in accordance with an aspect of the present application. A network 200 can include a number of network devices (e.g., switches), and may include network devices, such as layer-2 and layer-3 hops, and tunnels. In some examples, network 200 can be an Ethernet network, InfiniBand network, or other network, and may use a corresponding communication protocol, such as IP, FCoE, or other protocols. Network 200 can include network devices 212, 214, 216, and 218. These network devices can be individual physical network devices or networking units (e.g., switching units, such as switch blades) within a chassis. A respective network device in network 200 can be assigned a MAC address and an IP address and can include at least one processing resource. Examples of a processing resource can include, but are not limited to, a processor core, a GPU, and a TPU. The network device can also include at least one non-transitory computer-readable medium storing instructions that when executed by the processing resource to perform one or more operations. The network device can further include forwarding hardware (e.g., the ASIC of the network device, which can at least incorporate a TCAM).

In this example, network devices 212, 214, 216, and 218 can form a distributed switch 210 based on network virtualization technology. If the network virtualization technology is switch stacking, distributed switch 210 can be a switch stack (e.g., a VSF stack). Distributed switch 210 can be coupled to an external network 220, which can be a WAN, such as the Internet, via network devices 212 and 214. Distributed switch 210 may couple a large number of user devices 270 (e.g., hosts and servers) to external network 220. As a result, distributed switch 210 can be the initial hop for packets sent from user devices 270. A NAT instance 280 can be deployed on distributed system 210 to facilitate the translation between the public IP address and the private IP addresses of user devices 270. Deploying NAT instance 280 can include deploying it on a respective network device of distributed switch 210. Deploying NAT instance 280 on the network device can include running a NAT daemon on the network device. NAT instance 280 can allocate a NAT port from a set of NAT ports 250 to a corresponding private IP address. NAT ports 250 can indicate a range of NAT ports available to NAT instance 280.

NAT ports 150 available to NAT instance 280 can be divided into subsets 252, 254, 256, and 258, each corresponding to a network device in distributed switch 210. To facilitate the allocation of NAT ports 250, distributed switch 210 can include a management unit 260. Management unit 260 can be implemented using software, hardware, or a combination thereof. Management unit 260 can be deployed on a management device (e.g., a network orchestrator not shown in FIG. 2A) that can provision and configure a respective network device in distributed switch 210. Management unit 260 may also be deployed on a respective network device of distributed switch 210.

For example, management unit 260 can be deployed with NAT instance 280 (e.g., with the NAT daemon) on a respective network device. Management unit 260 can determine the ratio of the expected number of user devices associated with network devices 212, 214, 216, and 218. Subsequently, management unit 260 can divide NAT ports 250 into subsets 252, 254, 256, and 258 and allocate them to network devices 212, 214, 216, and 218, respectively. To allocate more NAT ports to the network device, management unit 260 may reserve a pool of NAT ports 282 that are not placed into subsets 252, 254, 256, and 258.

User device 274 can be coupled to network devices 216 and 218 over an MC-LAG 290. To send packet 262, user device 274 can use the header information of packet 262 and select one of network devices 216 and 218 for forwarding packet 262. The header information can include source IP address 234, destination IP address 236, source port 224, and destination port 226. For example, user device 274 may apply a hash function to the header information to select network device 216. Network device 216 can then allocate a NAT port 222 for private IP address 234 of user device 274 and maintain the corresponding NAT mappings. Since the hash function may select the same network device 216 for a respective packet of the same data flow (e.g., packets between IP addresses 232 and 234), subsequent packets can be sent to network device 216.

When network device 216 receives packet 262 with private IP address 234 as the source address from user device 274, NAT instance 260 of network device 216 can detect IP address 234 as a private IP address based on the predetermined range of IP addresses reserved as "private." NAT instance 260 can also detect protocol port 224 as the source protocol port. NAT instance 260 can then allocate public IP address 232 and NAT port 222 from subset 256 to IP address 234 and generate corresponding NAT mappings between them. Here, NAT port 222 can be uniquely allocated to IP address 234. As a result, when network device 216 receives a packet with NAT port 222, the NAT mappings matching NAT port 222 can indicate IP address 234.

Since subset 256 is allocated to network device 216, the NAT mappings associated with subset 256 can be generated and maintained at network device 216. The NAT mappings can be maintained in an MDS 240. MDS 240 can be programmed in forwarding hardware 292, which can include a TCAM, of network device 216. As a result, when a packet matching one of the NAT mappings in MDS 240 is received by network device 216, network device 216 can perform address translation based on the matched NAT mapping. For example, for IP address 234, MDS 240 can include a forward mapping 242 that corresponds to the address translation when IP address 234 is a source address (i.e., for packets from user device 274).

Forward mapping 242 can map the tuple [IP address 234, protocol port 224] to the tuple [public IP address 232, NAT port 222]. MDS 240 can also include a reverse mapping 244 that corresponds to the address translation when IP address 232 is a destination address and NAT port 222 is the destination port (i.e., for packets destined to user device 274). Reverse mapping 244 can map the tuple [public IP address 232, NAT port 222] to the tuple [IP address 234, protocol port 224]. When the forwarding hardware of network device 216 receives a packet, it can perform a lookup using the IP addresses and ports in the header of the packet on MDS 240 (e.g., in forwarding hardware 292). If a match is found, NAT instance 260, using forwarding hardware 292, can perform the address translation on the packet.

To perform the address translation, forwarding hardware 292 can look up the IP addresses and ports of packet 262 in MDS 240. IP address 234 and port 224 can match NAT mapping 242 in MDS 240. NAT mapping 242 can indicate that IP address 234 corresponds to IP address 232, and protocol port 224 corresponds to NAT port 222. Accordingly, NAT instance 260, using forwarding hardware 292, can perform forward address translation on packet 262 by replacing IP address 234 with IP address 232, and protocol port 224 with NAT port 222. In this way, network device 216 can generate translated packet 264 that can include IP address 232 as the source address and NAT port 222 as the source port. Network device 216 can then forward packet 264 to network device 214, which can then forward packet 264 to device 276 via network 220.

To support address translations in the reserve direction based on NAT mappings 242 and 244, a respective network device in distributed switch 210 can be programmed with a forwarding policy 230 indicating the subset of NAT ports and the corresponding network device. For example, forwarding policy 230 can indicate that subsets 252, 254, 256, and 258 correspond to network devices 212, 214, 216, and 218, respectively. In forwarding policy 230, subsets 252, 254, 256, and 258 may be represented by their corresponding range of NAT ports.

When network device 212 receives packet 266 destined to user device 274, network device 212 can typically apply a load-balancing mechanism (e.g., round-robin selection) to select one of network devices 216 and 218 for forwarding packet 266. To ensure packet forwarding to network device 216, which maintains NAT mappings 242 and 244, network device 212 may bypass the load-balancing mechanism. Instead of load balancing among network devices 216 and 218, network device 212 can forward packet 266 based on forwarding policy 230, which can cause packet to be forwarded to network device 216.

When network device 216 receives packet 266, forwarding hardware 292 can look up the IP addresses and ports of packet 266 in MDS 240. During the lookup, IP address 232 and port 222 can match NAT mapping 244 in MDS 240. NAT mapping 244 can indicate that IP address 232 corresponds to IP address 234, and NAT port 222 corresponds to protocol port 224. Accordingly, NAT instance 260, using forwarding hardware 292, can perform reverse address translation on packet 266 by replacing IP address 232 with IP address 234, and NAT port 222 with protocol port 224. In this way, network device 216 can generate reverse-translated packet 268 that can include IP address 234 as the destination address and protocol port 224 as the destination port. Network device 216 can then forward packet 268 to user device 274 based on IP address 234.

Figure 2B:
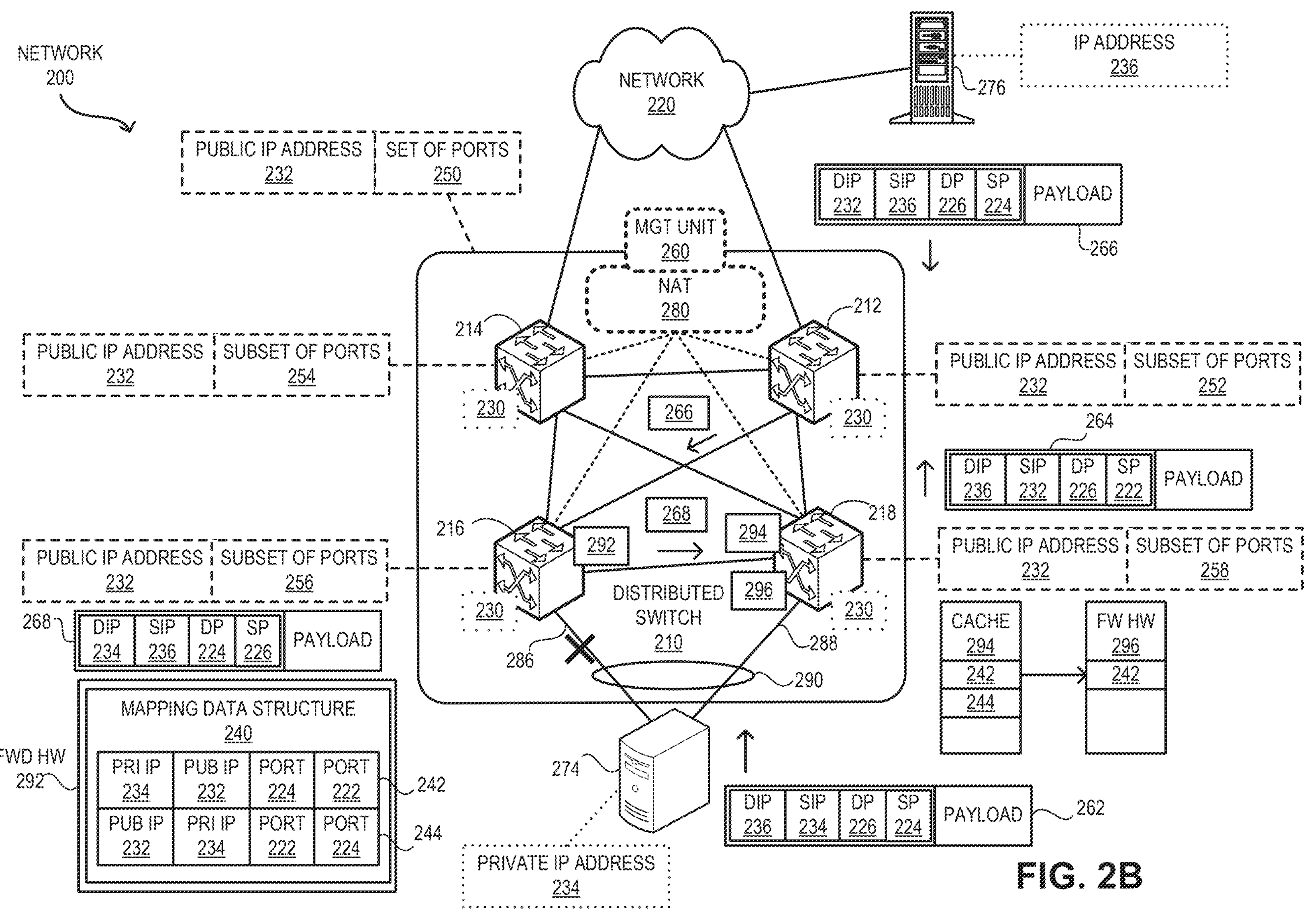
FIG. 2B illustrates an example of efficient address translation associated with a NAT deployment in the event of a link failure in an MC-LAG of a distributed switch, in accordance with an aspect of the present application.

FIG. 2B illustrates an example of efficient address translation associated with a NAT deployment in the event of a link failure in an MC-LAG of a distributed switch, in accordance with an aspect of the present application. MC-LAG 290 can facilitate high availability between network devices 216 and 218 for user device 274. To ensure a quick failover for facilitating high availability, network device 216 can synchronize NAT mappings 242 and 244 with network device 218. Even though NAT mappings 242 and 244 are programmed in forwarding hardware 292, network device 218 can store NAT mappings 242 and 244 in a cache 294 in the memory of network device 218. Therefore, if the links and network devices associated with MC-LAG 290 are operational, NAT mappings 242 and 244 can remain in cache 294 without programming them in forwarding hardware 296 of network device 218.

In this example, MC-LAG 290 can include link 286 coupling network device 216 and user device 274, and link 288 coupling network device 218 and user device 274. If link 286 in MC-LAG 290 becomes unavailable (denoted with a cross), packet 262 from user device 274 can be received by network device 218 via active link 288 in MC-LAG 290. Upon receiving packet 262, forwarding hardware 296 of network device 218 may not detect NAT mappings 242 and 244 (i.e., the NAT mappings with private IP address 234 and corresponding NAT port 222). Network device 218 can then obtain forward mapping 242 associated with IP address 234 from cache 294 and program forward mapping 242 in forwarding hardware 296.

In the reverse direction, network device 216 can still receive packets from network devices 214 and 216 within distributed switch 110. Therefore, network devices 214 and 216 can continue to forward packets, such as packet 266, to network device 216 based on forwarding policy 230. However, network device 216 can detect the unavailability of link 286 via the port of network device 216 that couples link 286 (e.g., based on the loss of signal). Therefore, network device 216 can receive packet 266 and determine that it cannot forward packet 266 via MC-LAG 290. Accordingly, network device 216 can perform reverse translation on packet 266 to generate reverse-translated packet 268 and forward packet 268 to network device 218. In turn, network device 218 can forward packet 268 to user device 274 via link 288 in MC-LAG 290.

Figure 2C:
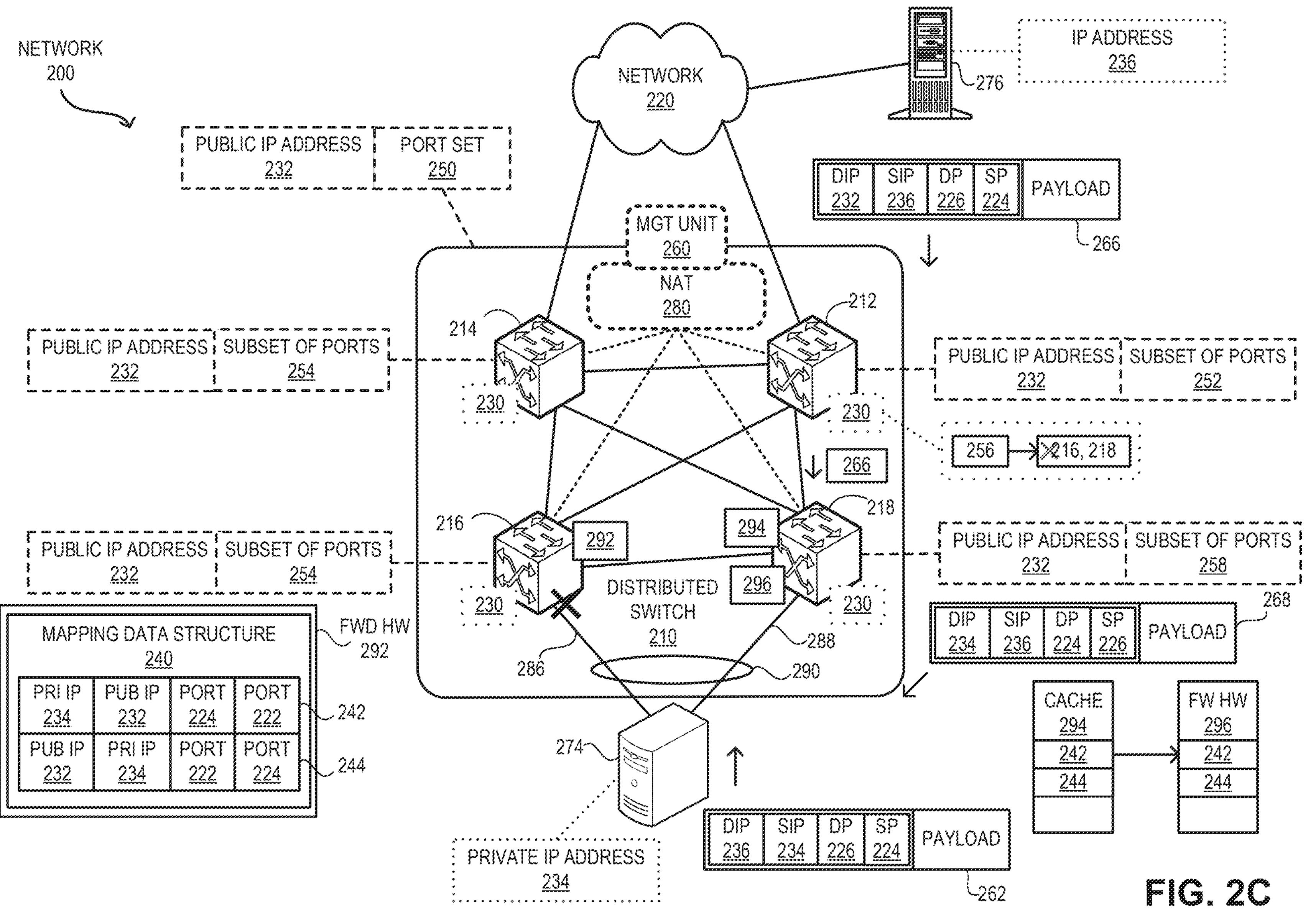
FIG. 2C illustrates an example of efficient address translation associated with a NAT deployment in the event of a node failure in an MC-LAG of a distributed switch, in accordance with an aspect of the present application.

FIG. 2C illustrates an example of efficient address translation associated with a NAT deployment in the event of a node failure in an MC-LAG of a distributed switch, in accordance with an aspect of the present application. If network device 216 becomes unavailable (denoted with a cross), network device 216 can no longer perform forward or reverse address translation on the packets with IP address 234. Here, network device 216 can become unavailable due to the node failure (i.e., failure of network device 216). Network device 218 can detect the unavailability via a link coupling network device 216. Since network devices 216 and 218 are peer network devices of MC-LAG 290, they can exchange keepalive packets at predetermined intervals. If network device 218 does not receive the keepalive packets for a predetermined number of times (e.g., three times), network device 218 can determine that network device 216 has become unavailable. Network device 218 can then obtain NAT mappings 242 and 244 from cache 294 and program the mappings in forwarding hardware 296. As a result, network device 218 can perform forward translation on packet 262 from user device 274 received via link 288 of MC-LAG 290.

To efficiently transition from network device 216 to network device 218 for packet forwarding in the reverse direction, forwarding policy 230 can indicate network device 218 as a standby device for subset 256. As a result, management unit 260 doesn't need to update or regenerate forwarding policy 230 indicating network device 218 to be associated with subset 256. Instead, upon detecting the unavailability of network device 218, network devices 212 and 214 can check forwarding policy 230 and determine that network device 216 indicated in forwarding policy 230 is no longer available (denoted with a cross). Network devices 212 and 214 can then identify network device 218 as the standby device from forwarding policy 230. Hence, network devices 212 and 214 can determine that subset 256 is currently associated with network device 218. Accordingly, in the reverse direction, network device 212 can forward packet 266 to network device 218. Network device 218 can receive packet 266, perform the reverse translation on packet 266 to generate reverse-translated packet 268, and forward packet 268 to user device 274 via link 288 in MC-LAG 290.

Figure 3:
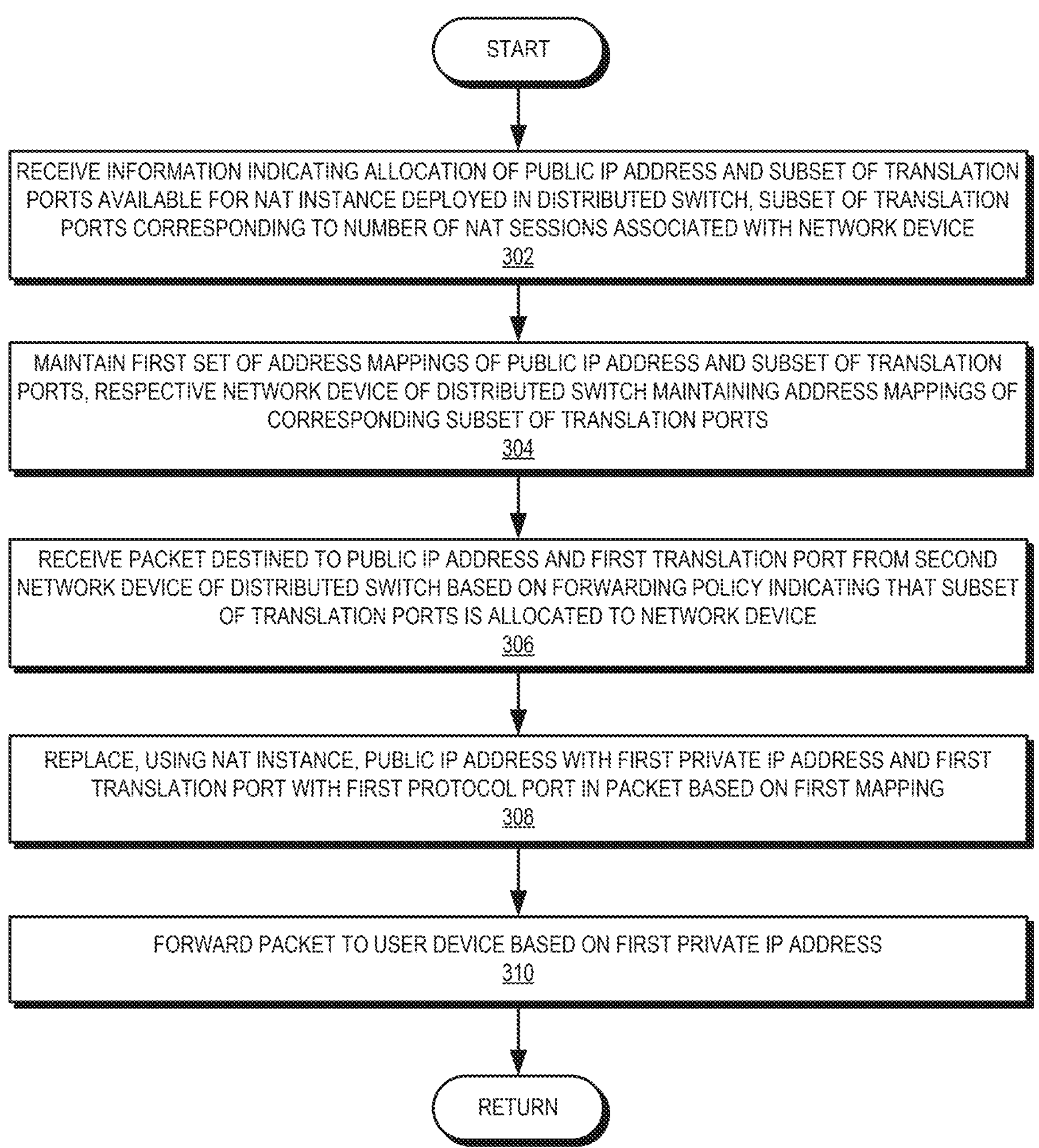
FIG. 3 presents a flowchart illustrating an example of a process of a network device in a distributed switch performing address translation for forwarding a packet, in accordance with an aspect of the present application.

FIG. 3 presents a flowchart illustrating an example of a process of a network device in a distributed switch performing address translation for forwarding a packet, in accordance with an aspect of the present application. During operation, the network device can receive information indicating the allocation of a public IP address (e.g., IP address 132 in FIG. 1A) and a subset of NAT ports available for a NAT instance deployed in a distributed switch (operation 302). Here, the subset of NAT ports can correspond to the number of NAT sessions associated with the network device. A management unit of the distributed system can provide the information indicating the allocation information to the network device. Consequently, the NAT instance of the network device can be aware of the subset associated with it. In the example in FIG. 1A, NAT instance 180 can be deployed in distributed switch 110. Subset 156 of NAT ports 150 available to NAT instance 180 can be allocated to network device 116.

The network device can maintain a first set of address mappings of the public IP address and the subset of the NAT ports (operation 304). A respective network device of the distributed switch can maintain address mappings of the corresponding subset of the NAT ports. Here, each network device of the distributed switch can be associated with a subset of the NAT ports. As a result, that network device can maintain the NAT mappings associated with the corresponding subset. In the example in FIG. 1A, network device 116 can maintain NAT mappings 142 and 144 associated with subset 156. Similarly, network devices 112, 114, and 118 can maintain the NAT mappings associated with subsets 152, 154, and 158, respectively.

The network device can receive a packet destined to the public IP address and a first NAT port from a second network device of the distributed switch based on a forwarding policy indicating that the subset of NAT ports is allocated to the network device (operation 308). When the network device receives a packet from a user device, the network device can allocate the first NAT port to a first private IP address of the user device and generate corresponding NAT mappings. To support address translations in the reserve direction based on these NAT mappings, a respective network device can be programmed with the forwarding policy indicating the subset of NAT ports and the corresponding network device. Accordingly, when the second network device of the distributed switch receives a packet destined to the public IP address and the first NAT port, it can forward the packet to the network device. In the example in FIG. 1B, network device 112 can forward packet 166 destined to public IP address 132 and NAT port 122 to network device 116 based on forwarding policy 130.

The network device can then replace, using the NAT instance, the IP address with the first private IP address and the first NAT port with a first protocol port in the packet based on the first mapping (operation 308). Here, the NAT instance can perform the address translation at the network device. Based on the first mapping, the network device can perform an address translation on the packet. In the example in FIG. 1B, network device 116 can use NAT instance 180 to perform the address translation on packet 166 based on NAT mapping 144. Since packet 166 is destined to public IP address 132, the address translation can replace IP address 132 with IP address 134, and NAT port 122 with protocol port 124. The network device can then forward the packet to the user device based on the first private IP address (operation 310). In the example in FIG. 1B, network device 116 can forward packet 168, which can be generated when network 116 performs address translation on packet 166, to user device 174 based on IP address 134.

Figure 4A:
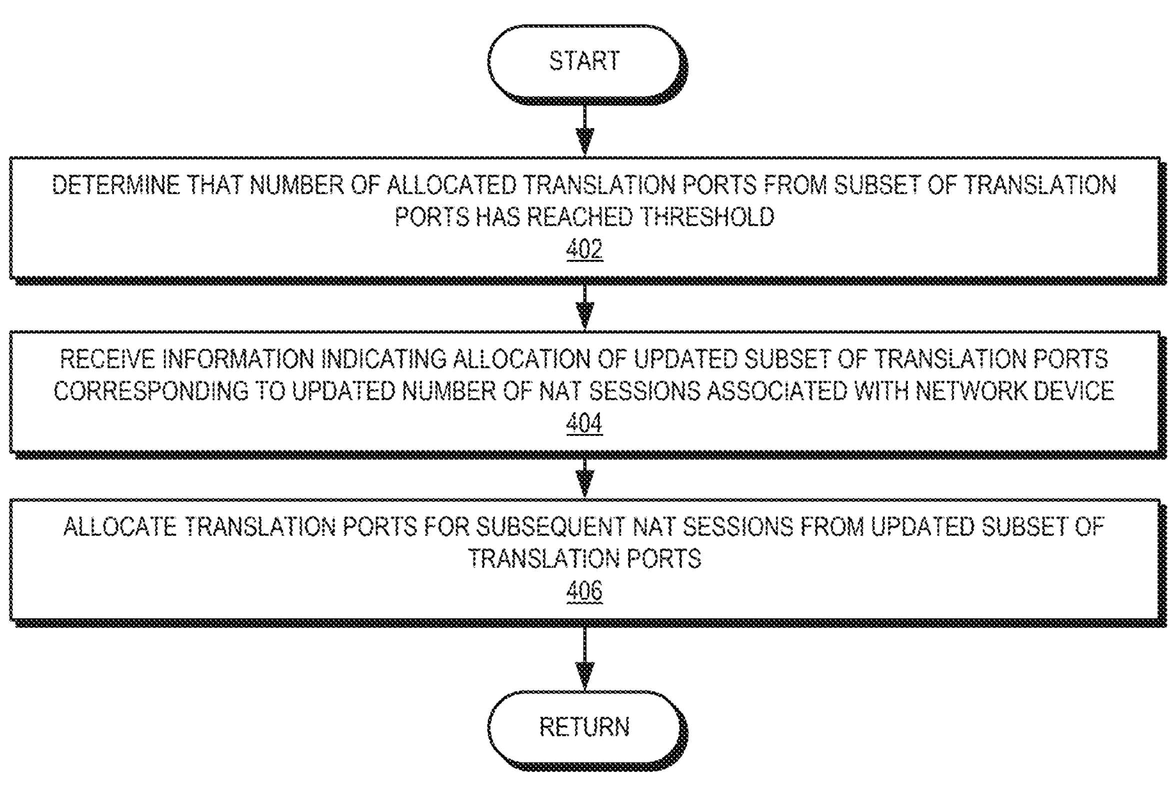
FIG. 4A presents a flowchart illustrating an example of a process of a network device in a distributed switch reallocating NAT ports associated with a NAT deployment, in accordance with an aspect of the present application.

FIG. 4A presents a flowchart illustrating an example of a process of a network device in a distributed switch reallocating NAT ports associated with a NAT deployment, in accordance with an aspect of the present application. During operation, the network device can determine that the number of allocation NAT ports from the subset of the NAT ports has reached a threshold (operation 402). The network device may couple more user devices than initially estimated. Since a NAT port is allocated to the private IP address of a respective user device, the subset of the NAT ports associated with the network device may become close to exhaustion. If the number of allocated NAT ports in the subset reaches a threshold (e.g., 80% of the number of NAT ports in the subset), the network device may need more NAT ports. In the example in FIG. 1C, network device 116 can determine that the number of allocated NAT ports from subset 156 has reached the threshold.

The network device can receive information indicating the allocation of an updated subset of the NAT ports corresponding to the updated number of NAT sessions associated with the network device (operation 404). A pool of NAT ports in the NAT ports available to the NAT instance can be reserved for subsequent allocation. The reserved pool of NAT ports may not initially be divided into the subsets. When the number of allocated NAT ports in the subset reaches the threshold, a portion of the reserved pool of NAT ports can be incorporated into the subset, thereby generating the updated subset of the NAT ports. The network device can then allocate NAT ports for subsequent NAT sessions from the updated subset of the NAT ports (operation 406). Since the updated subset of the NAT ports is associated with the network device, any unallocated NAT port in the updated subset of the NAT ports can be allocated for the subsequent NAT sessions. In the example in FIG. 1C, a portion 184 of reserved pool of NAT ports 182 can be incorporated into subset 156 to generate the updated subset 186. Network device 116 can then allocate NAT ports for subsequent NAT sessions from subset 186.

Figure 4B:
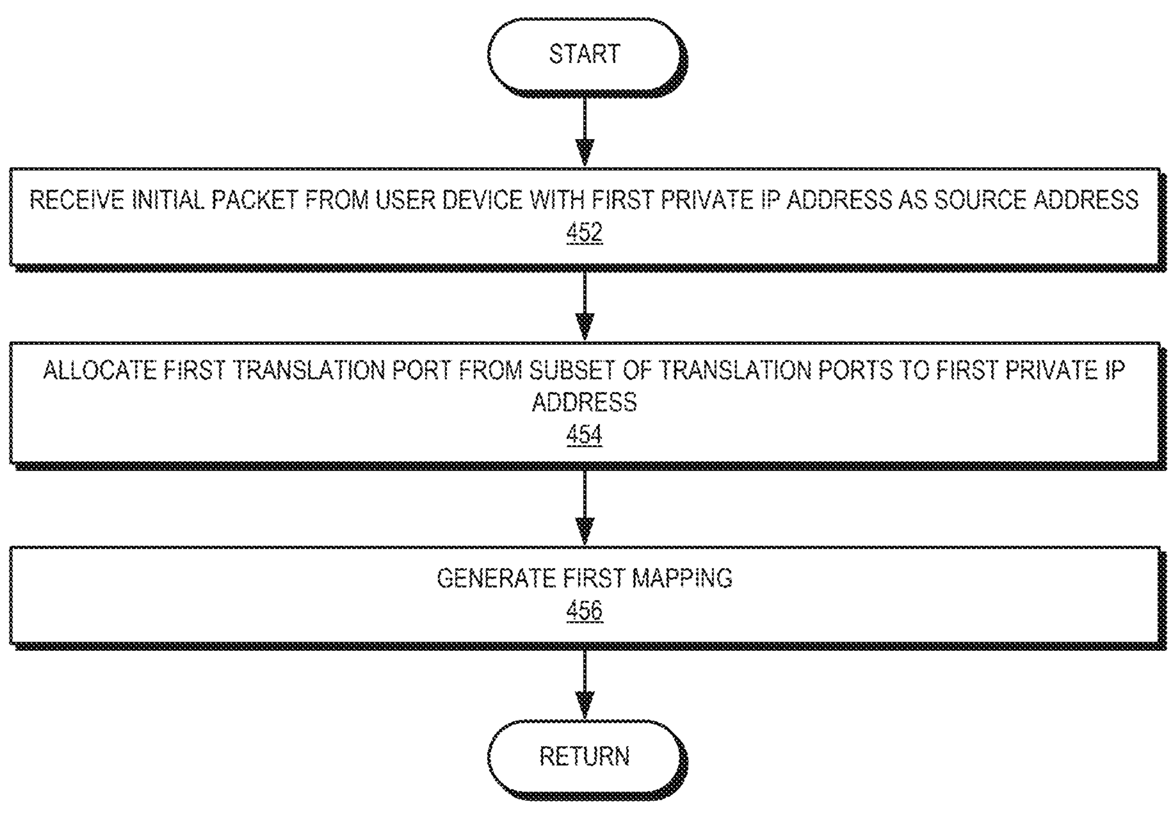
FIG. 4B presents a flowchart illustrating an example of a process of a network device in a distributed switch allocating a NAT port associated with a NAT deployment for an end device, in accordance with an aspect of the present application.

FIG. 4B presents a flowchart illustrating an example of a process of a network device in a distributed switch allocating a NAT port associated with a NAT deployment for an end device, in accordance with an aspect of the present application. During operation, the network device can receive an initial packet from a user device with the first private IP address as the source address (operation 452). Here, the first private IP address can correspond to the first private IP address of FIG. 3. Since the packet can be the initial packet of a data flow, the network device may not have a NAT mapping for the first private IP address. As a result, when the network device performs a lookup in the MDS, the network device may not find a corresponding mapping. In the example in FIG. 1A, when network device 116 receives packet 162, it can determine that there is no entry for private IP address 134, which can be the source address of packet 162.

The network device can then allocate the first NAT port from the subset of NAT ports (e.g., the first NAT port and the subset of NAT ports of FIG. 3) to the first private IP address (operation 454). The first NAT port can uniquely correspond to the first private IP address in the NAT mappings of the network device. As a result, when a packet with the public IP address and the first NAT port is received at the network device, the public IP address can be replaced by the first private IP address. Accordingly, the network device can generate the first mapping (operation 456). The first mapping can be one of the mappings in the first set of address mappings of FIG. 3. The first mapping can be between the first private IP address and the public IP address, and between a protocol port of the packet and the first NAT port. In the example in FIG. 1A, upon receiving packet 162, network device 116 can allocate NAT port 122 to private IP address 134.

Figure 5A:
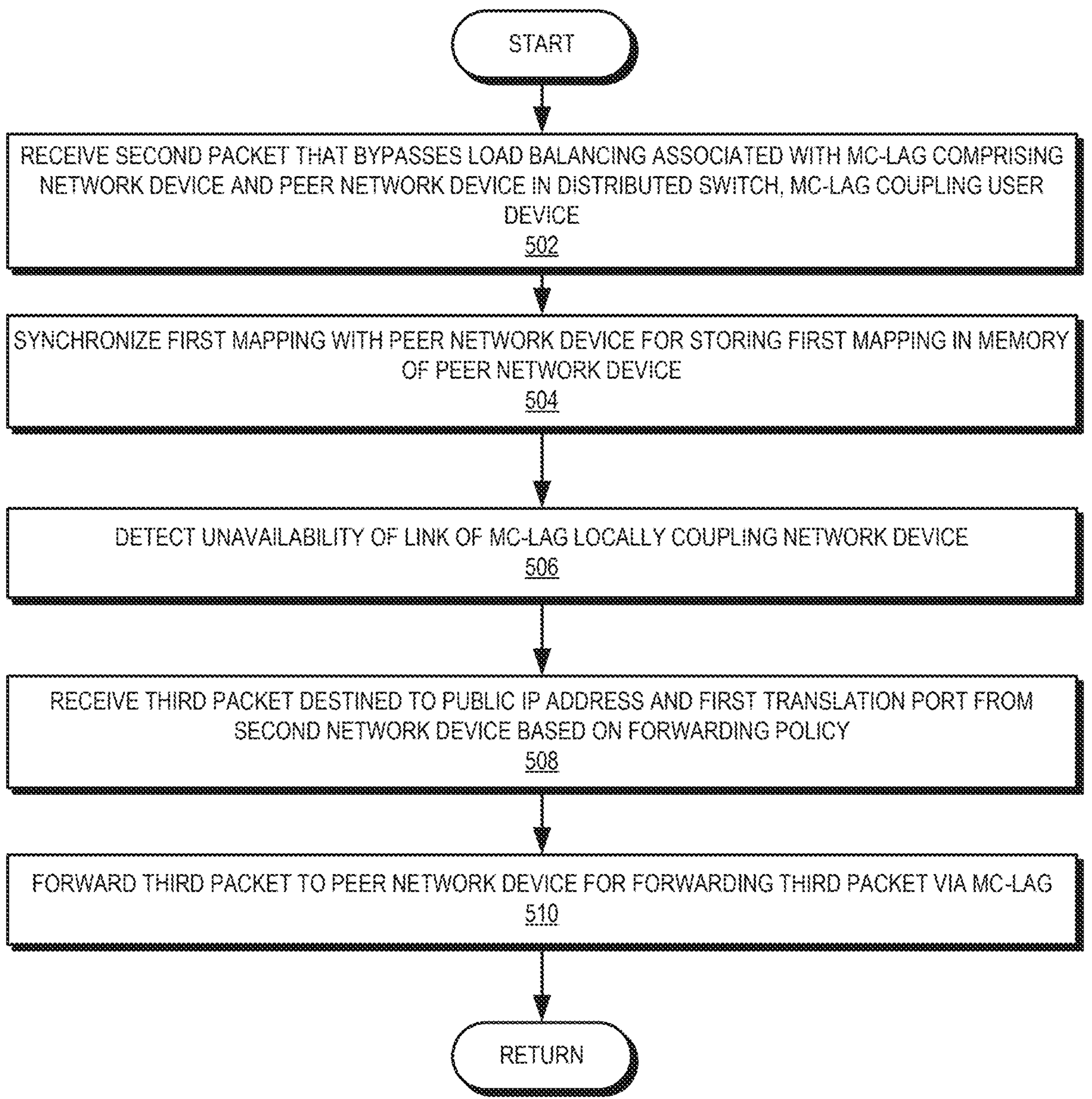
FIG. 5A presents a flowchart illustrating an example of a process of a network device in a distributed switch performing address translation for forwarding a packet in the event of a link failure in an MC-LAG, in accordance with an aspect of the present application.

FIG. 5A presents a flowchart illustrating an example of a process of a network device in a distributed switch performing address translation for forwarding a packet in the event of a link failure in an MC-LAG, in accordance with an aspect of the present application. During operation, the network device can receive a second packet that bypasses the load balancing associated with the MC-LAG comprising the network device and a peer network device in the distributed switch (operation 502). Here, the MC-LAG can couple the user device of FIG. 3. If another network device of the distributed switch receives a packet destined to the user device, the other network device can typically apply a load-balancing mechanism to select one of the network devices of the MC-LAG. Instead of using the load balancing mechanism, the other network device can forward the packet based on the forwarding policy, which can cause the packet to be forwarded to the network device. In the example in FIG. 2A, network devices 216 and 218 can couple user device 274 via MC-LAG 290. When network device 212 receives packet 266, network device 212 can bypass the load balancing mechanism and forward packet 266 to network device 216 based on forwarding policy 230.

The network device can synchronize the first mapping with the peer network device for storing the first mapping in the memory of the peer network device (operation 504). To ensure high availability between the network device and the peer network devices, the network device can synchronize its NAT mappings, such as the first mapping, with the peer network device. However, instead of programming the first mapping in the forwarding hardware, the peer network device can cache the first mapping in its memory. In the example in FIG. 2B, network device 216 can synchronize NAT mappings 142 and 144 with peer network device 218, which can then cache NAT mappings 142 and 144 in its memory.

The network device can detect the unavailability of a link of the MC-LAG coupling the network device (operation 506). Since the link is locally coupled to the network device via a port, the network device can detect the unavailability from the port. In the example in FIG. 2B, network device 216 can detect the unavailability of link 286 in MC-LAG 290. However, since network device 216 can remain operational, forwarding policy 230 can still indicate network device 216 as associated with subset 256. Therefore, network device 212 can send packet 266 to network device 216. Accordingly, the network device can receive a third packet destined to the public IP address and the first NAT port, as indicated in FIG. 3, from the second network device based on the forwarding policy (operation 508).

The network device can then forward the third packet to the peer network device for forwarding the third packet via the MC-LAG (operation 510). When the network device receives the third packet, the network device can determine that it cannot forward the third packet via the MC-LAG due to the unavailability of the link. Accordingly, the network device can perform an address translation on the third packet and forward it to the peer network device, which can then forward the third packet via the MC-LAG. In the example in FIG. 2B, network device 216 can receive packet 266 and determine that it cannot forward packet 266 via MC-LAG 290. Hence, network device 216 can perform the address translation on packet 266 and forward it to network device 218 for forwarding via MC-LAG 290.

Figure 5B:
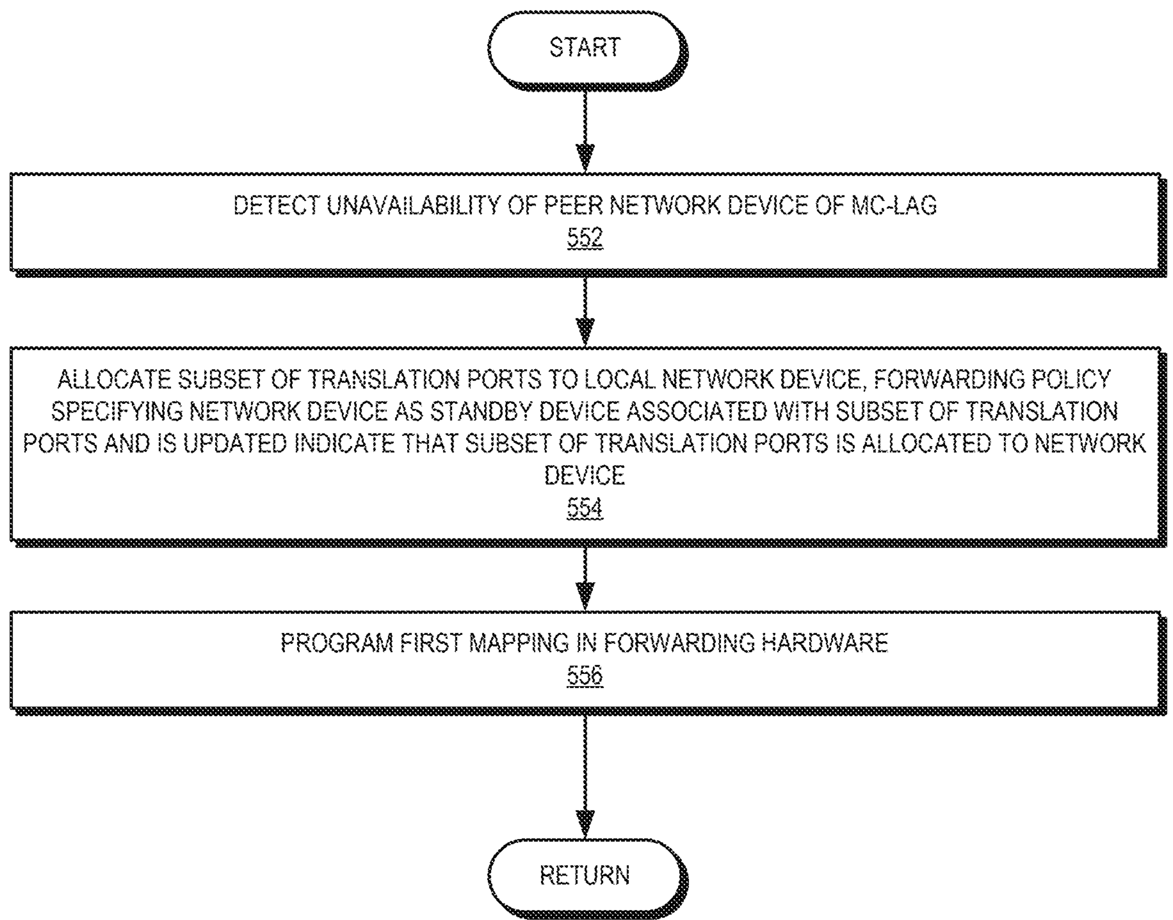
FIG. 5B presents a flowchart illustrating an example of a process of a network device in a distributed switch performing address translation for forwarding a packet in the event of a node failure in an MC-LAG, in accordance with an aspect of the present application.

FIG. 5B presents a flowchart illustrating an example of a process of a network device in a distributed switch performing address translation for forwarding a packet in the event of a node failure in an MC-LAG, in accordance with an aspect of the present application. During operation, the network device can detect the unavailability of a peer network device of the MC-LAG (operation 552). Since the network device can be coupled to the peer network device in the distributed switch, the network device can detect the unavailability of the peer network device. Since the network device and the peer network device are coupled to the MC-LAG, they can exchange keepalive packets at predetermined intervals. If the network device does not receive the keepalive packets for a predetermined number of times (e.g., three times), the network device can determine that the peer network device has become unavailable.

The network device can then allocate the subset of the NAT ports, as indicated in FIG. 3, to the local network device (i.e., to itself) (operation 554). Here, the forwarding rule (e.g., the forwarding rules of FIG. 3) can specify the network device as the standby device associated with the subset of NAT ports and can be updated to indicate that the subset of the NAT ports is allocated to the network device. In the example in FIG. 2C, network devices 216 and 218 are peer network device devices in MC-LAG 290. Network device 218 can detect the unavailability of network device 216. Forwarding policy 230 can specify network device 216 to be associated with subset 256 and network device 218 as the standby device. When network device 216 becomes unavailable, forwarding policy 230 can be updated to specify that subset 256 has been allocated to network device 218.

The network device can then program the first mapping in the forwarding hardware (operation 556). To ensure a quick failover for facilitating high availability, the peer network device can synchronize the first mappings with the network device. The network device can store the first mapping in a cache in the memory of the network device. When the network device detects the unavailability of the peer network device, the network device can obtain the first mapping from the cache and program it in the forwarding hardware. In the example in FIG. 2C, network device 216 can synchronize NAT mappings 242 and 244 with network device 218. Network device 218 can store NAT mappings 242 and 244 in a cache 294 in the memory of network device 218. Upon detecting the unavailability of network device 216, network device 218 can program NAT mappings 242 and 244 in forwarding hardware 296 of network device 218.

Figure 6:
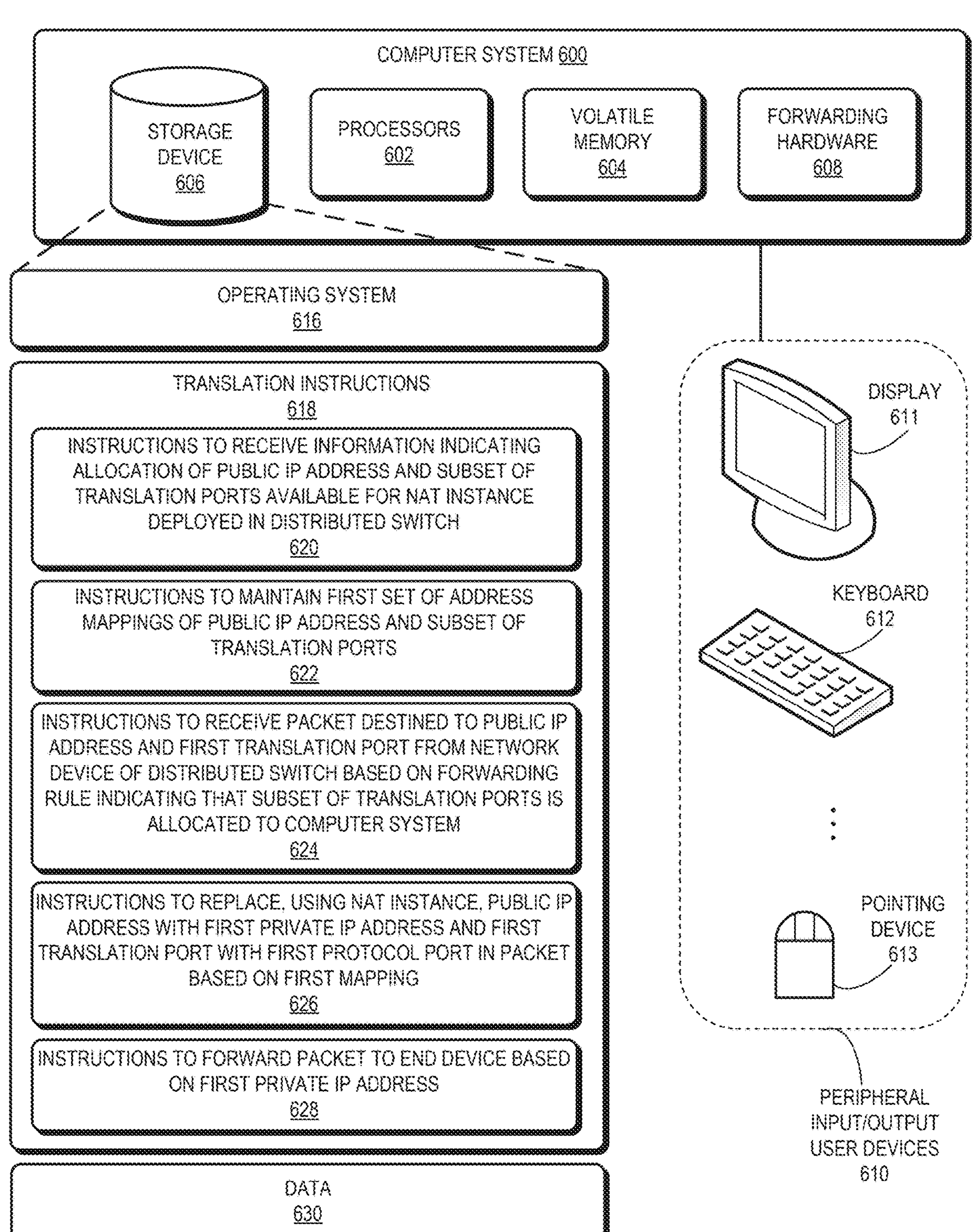
FIG. 6 illustrates an example of a computing system facilitating efficient address translation associated with a NAT deployment in a distributed switch, in accordance with an aspect of the present application.

FIG. 6 illustrates an example of a computing system facilitating efficient address translation associated with a NAT deployment in a distributed switch, in accordance with an aspect of the present application. Computer system 600 includes one or more processors 602, a memory 604, a storage device 606, and forwarding hardware 608. Processors 602 can include one or more processing resources, such as processor cores, GPUs, and TPUs. Memory 604 can include a volatile memory (e.g., random access memory (RAM)) that serves as a managed memory and can be used to store one or more memory pools. Furthermore, computer system 600 can be coupled to peripheral I/O user devices 610 (e.g., a display device 611, a keyboard 612, and a pointing device 613). Forwarding hardware 608 can include a TCAM. Storage device 606 includes a non-transitory computer-readable storage medium and stores an operating system 616, translation instructions 618, and data 630. Computer system 600 may include fewer or more entities or instructions than those shown in FIG. 6.

Translation instructions 618 can include instructions, which when executed by computer system 600, can cause computer system 600 to perform methods and/or processes described in this disclosure. Computer system 600 can be a network device in a distributed system, such as network devices 116 and 216 in FIGS. 1 and 2, respectively. Specifically, translation instructions 618 may include instructions 620 to receive information indicating the allocation of a public IP address and a subset of NAT ports available for a NAT instance deployed in a distributed switch. In the example in FIG. 1A, NAT instance 180 can be deployed in distributed switch 110. Subset 156 of NAT ports 150 available to NAT instance 180 can be allocated to network device 116. Translation instructions 618 may also include instructions 622 to maintain a first set of address mappings of the public IP address and the subset of the NAT ports. In the example in FIG. 1A, network device 116 can maintain NAT mappings 142 and 144 associated with subset 156.

Furthermore, translation instructions 618 may also include instructions 624 to receive a packet destined to the public IP address and a first NAT port from a second network device of the distributed switch based on a forwarding policy indicating that the subset of NAT ports is allocated to computer system 600. In the example in FIG. 1B, network device 112 can forward packet 166 destined to public IP address 132 and NAT port 122 to network device 116 based on forwarding policy 130. Translation instructions 618 may include instructions 626 to replace, using the NAT instance, the IP address with the first private IP address and the first NAT port with a first protocol port in the packet based on the first mapping. In the example in FIG. 1B, network device 116 can use NAT instance 180 to perform the address translation on packet 166 based on NAT mapping 144. Since packet 166 is destined to public IP address 132, the address translation can replace IP address 132 with IP address 134, and NAT port 122 with protocol port 124.

Moreover, translation instructions 618 may include instructions 628 to forward the packet to the user device based on the first private IP address. In the example in FIG. 1B, network device 116 can forward packet 168, which can be generated when network 116 performs address translation on packet 166, to user device 174 based on IP address 134. Data 630 can include any data that is required as input, or that is generated as output by the methods, operations, communications, and/or processes described in this disclosure. Specifically, data 634 can include the NAT mappings in the MDS (e.g., in forwarding hardware 608) and a forwarding policy (e.g., policy 130 in FIG. 1A). Data 630 can also include information identifying a respective network device in the distributed switch.

Computer system 600 and translation instructions 618 may include more instructions than those shown in FIG. 6. For example, translation instructions 618 can also store instructions for allocating NAT port 122 to private IP address 134 of user device 174 of FIG. 1A; generating NAT mappings 142 and 144 for NAT port 122 of FIG. 1A; performing forward address translation of FIG. 1A; forwarding packet 166 to network device 116 in distributed switch 110 based on forwarding policy 130 of FIG. 1B; incorporating portion 184 of pool of reserved ports 182 into subset 156 of FIG. 1C; receiving packet 266 bypassing the load balancing mechanism of network device 212 of FIG. 2A; performing address translation on packet 266 in the event of a link failure of FIG. 2B; allocating subset 256 to network device 218 in the event of a node failure of FIG. 2C; performing address translation on packet 266 in the event of a node failure of FIG. 2C; the operations depicted in the flowcharts of FIGS. 3, 4, and 5; and the instructions of non-transitory CRM 700 in FIG. 7.

FIG. 7 illustrates an example of a CRM facilitating efficient address translation associated with a NAT deployment in a distributed switch, in accordance with an aspect of the present application. CRM 700 can include one or more non-transitory computer-readable mediums or devices storing instructions that when executed by a computer or processor cause the computer or processor to perform a method. Therefore, the instructions in CRM 700 can be stored in one or more non-transitory computer-readable mediums or devices. CRM 700 can store instructions 710 to receive information indicating the allocation of a public IP address (e.g., IP address 132 in FIG. 1A) and a subset of NAT ports available for a NAT instance deployed in a distributed switch. In the example in FIG. 1A, NAT instance 180 can be deployed in distributed switch 110. Subset 156 of NAT ports 150 available to NAT instance 180 can be allocated to network device 116. CRM 700 can also include instructions 712 to maintain a first set of address mappings of the public IP address and the subset of the NAT ports. In the example in FIG. 1A, network device 116 can maintain NAT mappings 142 and 144 associated with subset 156.

CRM 700 can include instructions 714 to receive a packet destined to the public IP address and a first NAT port from a second network device of the distributed switch based on a forwarding policy indicating that the subset of NAT ports is allocated to the first network device. In the example in FIG. 1B, network device 112 can forward packet 166 destined to public IP address 132 and NAT port 122 to network device 116 based on forwarding policy 130. CRM 700 can additionally include instructions 716 to replace, using the NAT instance, the IP address with the first private IP address and the first NAT port with a first protocol port in the packet based on the first mapping. In the example in FIG. 1B, network device 116 can use NAT instance 180 to perform the address translation on packet 166 based on NAT mapping 144. CRM 700 can further include instructions 718 to forward the packet to the user device based on the first private IP address. In the example in FIG. 1B, network device 116 can forward packet 168, which can be generated when network 116 performs address translation on packet 166, to user device 174 based on IP address 134.

CRM 700 may include more instructions than those shown in FIG. 7. For example, CRM 700 can also store instructions for allocating NAT port 122 to private IP address 134 of user device 174 of FIG. 1A; generating NAT mappings 142 and 144 for NAT port 122 of FIG. 1A; performing forward address translation of FIG. 1A; forwarding packet 166 to network device 116 in distributed switch 110 based on forwarding policy 130 of FIG. 1B; incorporating portion 184 of pool of reserved ports 182 into subset 156 of FIG. 1C; receiving packet 266 bypassing the load balancing mechanism of network device 212 of FIG. 2A; performing address translation on packet 266 in the event of a link failure of FIG. 2B; allocating subset 256 to network device 218 in the event of a node failure of FIG. 2C; performing address translation on packet 266 in the event of a node failure of FIG. 2C; the operations depicted in the flowcharts of FIGS. 3, 4, and 5; and the instructions of computer system 600 in FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a network device in a distributed switch. During operation, the network device can receive information indicating the allocation of a public IP address and a subset of NAT ports available for a NAT instance deployed in the distributed switch. The distributed switch can include a plurality of network devices operating as a single switch. Furthermore, the subset of the NAT ports corresponds to a number of NAT sessions associated with the network device. The network device can maintain a first set of address mappings of the public IP address and the subset of the NAT ports. Here, a respective network device of the distributed switch can maintain address mappings of a corresponding subset of the NAT ports. The network device can then generate, in the first set of address mappings, a first mapping between a first private IP address of a user device and a first protocol port and the public IP address and a first NAT port from the subset of the NAT ports. The network device can receive a packet destined to the public IP address and the first NAT port from a second network device of the distributed switch based on a forwarding rule indicating that the subset of the NAT ports is allocated to the network device. Subsequently, the network device can replace, using the NAT instance, the public IP address with the first private IP address and the first NAT port with the first protocol port in the packet based on the first mapping. The network device can then forward the packet to the user device based on the first private IP address.

In a variation on this aspect, the network device can determine that a number of allocated NAT ports from the subset of the NAT ports has reached a threshold. The network device can then receive information indicating allocation of an updated subset of the NAT ports, wherein the updated subset corresponds to an updated number of NAT sessions associated with the network device.

In a variation on this aspect, the user device can be coupled to an MC-LAG comprising the network device and a peer network device in the distributed switch.

In a further variation, the network device can receive the second packet at the network device while bypassing load balancing associated with the MC-LAG.

In a further variation, the network device can synchronize the first mapping with the peer network device for storing the first mapping in a memory of the peer network device.

In a further variation, the network device can detect the unavailability of the network device and allocate the subset of the NAT ports to the peer network device. The network device can then program the first mapping in forwarding hardware of the peer network device.

In a further variation, the forwarding rule can specify the peer network device as a standby device associated with the subset of the NAT ports. Upon detecting the unavailability of the peer network device, the network device can update the forwarding rule to indicate that the subset of the NAT ports is allocated to the peer network device.

In a further variation, the network device can detect the unavailability of a link of the MC-LAG coupling the network device. The network device can receive a third packet destined to the public IP address and the first NAT port from the second network device based on the forwarding rule. Subsequently, the network device can forward the third packet to the peer network device for forwarding via the MC-LAG.

In a variation on this aspect, the network device can generate the first mapping by receiving an initial packet from the user device with the first private IP address as a source address. Subsequently, the network device can allocate the first NAT port from the subset of the NAT ports to the first private IP address.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

receiving, by a first network device in a distributed switch, information indicating allocation of a public Internet Protocol (IP) address and a subset of NAT ports available for a network address translation (NAT) instance deployed in the distributed switch, wherein the distributed switch comprises a plurality of network devices operating as a single switch, and wherein the subset of the NAT ports corresponds to a number of NAT sessions associated with the first network device;

maintaining, by the first network device, a first set of address mappings of the public IP address and the subset of the NAT ports, wherein a respective network device of the distributed switch maintains address mappings of a corresponding subset of the NAT ports;

generating a first mapping between a first private IP address of a user device and a first protocol port and the public IP address and a first NAT port from the subset of the NAT ports, wherein the first mapping is in the first set of address mappings;

receiving, by the first network device, a packet destined to the public IP address and the first NAT port from a second network device of the distributed switch based on a forwarding rule indicating that the subset of the NAT ports is allocated to the first network device;

replacing, using the NAT instance, the public IP address with the first private IP address and the first NAT port with the first protocol port in the packet based on the first mapping; and forwarding the packet to the user device based on the first private IP address.

2. The method of claim 1, further comprising:

determining that a number of allocated NAT ports from the subset of the NAT ports has reached a threshold; and receiving, by the first network device, information indicating allocation of an updated subset of the NAT ports, wherein the updated subset corresponds to an updated number of NAT sessions associated with the first network device.

3. The method of claim 1, wherein the user device is coupled to a multi-chassis link aggregation group (MC-LAG) comprising the first network device and a peer network device in the distributed switch.

4. The method of claim 3, further comprising receiving the second packet at the first network device while bypassing load balancing associated with the MC-LAG.

5. The method of claim 3, further comprising synchronizing the first mapping with the peer network device for storing the first mapping in a memory of the peer network device.

6. The method of claim 5, further comprising:

detecting unavailability of the first network device;

allocating the subset of the NAT ports to the peer network device; and programming the first mapping in forwarding hardware of the peer network device.

7. The method of claim 6, wherein the forwarding rule specifies the peer network device as a standby device associated with the subset of the NAT ports; and wherein, subsequent to detecting the unavailability of the first network device, the method further comprises updating the forwarding rule to indicate that the subset of the NAT ports is allocated to the peer network device.

8. The method of claim 3, further comprising:

detecting unavailability of a link of the MC-LAG coupling the first network device;

receiving a third packet destined to the public IP address and the first NAT port from the second network device based on the forwarding rule; and forwarding the third packet to the peer network device for forwarding via the MC-LAG.

9. The method of claim 1, wherein generating the first mapping further comprises:

receiving an initial packet from the user device with the first private IP address as a source address; and allocating the first NAT port from the subset of the NAT ports to the first private IP address.

10. A non-transitory computer-readable storage medium storing instructions to:

receive, by a first network device in a distributed switch, information indicating allocation of a public Internet Protocol (IP) address and a subset of NAT ports available for a network address translation (NAT) instance deployed in the distributed switch, wherein the distributed switch comprises a plurality of network devices operating as a single switch, and wherein the subset of the NAT ports corresponds to a number of NAT sessions associated with the first network device;

maintain, by the first network device, a first set of address mappings of the public IP address and the subset of the NAT ports, wherein a respective network device of the distributed switch maintains address mappings of a corresponding subset of the NAT ports;

generate a first mapping between a first private IP address of a user device and a first protocol port and the public IP address and a first NAT port from the subset of the NAT ports, wherein the first mapping is in the first set of address mappings;

receive, by the first network device, a packet destined to the public IP address and the first NAT port from a second network device of the distributed switch based on a forwarding rule indicating that the subset of the NAT ports is allocated to the first network device;

replace, using the NAT instance, the public IP address with the first private IP address and the first NAT port with the first protocol port in the packet based on the first mapping; and forward the packet to the user device based on the first private IP address.

11. The non-transitory computer-readable storage medium of claim 10, wherein the instructions are further to:

determine that a number of allocated NAT ports from the subset of the NAT ports has reached a threshold; and receive, by the first network device, information indicating allocation of an updated subset of the NAT ports, wherein the updated subset corresponds to an updated number of NAT sessions associated with the first network device.

12. The non-transitory computer-readable storage medium of claim 10, wherein the user device is coupled to a multi-chassis link aggregation group (MC-LAG) comprising the first network device and a peer network device in the distributed switch.

13. The non-transitory computer-readable storage medium of claim 12, wherein the instructions are further to receive the second packet at the first network device while bypassing load balancing associated with the MC-LAG.

14. The non-transitory computer-readable storage medium of claim 12, wherein the instructions are further to synchronize the first mapping with the peer network device for storing the first mapping in a memory of the peer network device.

15. The non-transitory computer-readable storage medium of claim 14, wherein the instructions are further to:

detect unavailability of the first network device;

allocate the subset of the NAT ports to the peer network device; and program the first mapping in forwarding hardware of the peer network device.

16. The non-transitory computer-readable storage medium of claim 15, wherein the forwarding rule specifies the peer network device as a standby device associated with the subset of the NAT ports; and wherein, subsequent to detecting the unavailability of the first network device, the instructions are further to update the forwarding rule to indicate that the subset of the NAT ports is allocated to the peer network device.

17. The non-transitory computer-readable storage medium of claim 12, wherein the instructions are further to:

detect unavailability of a link of the MC-LAG coupling the first network device;

receive a third packet destined to the public IP address and the first NAT port from the second network device based on the forwarding rule; and forward the third packet to the peer network device for forwarding via the MC-LAG.

18. The non-transitory computer-readable storage medium of claim 10, wherein, to generate the first mapping, the instructions are further to receive an initial packet from the user device with the first private IP address as a source address; and allocate the first NAT port from the subset of the NAT ports to the first private IP address.

19. A computer system, comprising:

one or more processing resources; and a non-transitory computer-readable storage medium storing instructions that when executed by the one or more processing resources cause the computer system to:

receive information indicating allocation of a public Internet Protocol (IP) address and a subset of NAT ports available for a network address translation (NAT) instance deployed in a distributed switch, wherein the distributed switch comprises a plurality of devices, which includes the computer system, operating as a single switch, and wherein the subset of the NAT ports corresponds to a number of NAT sessions associated with the computer system;

maintain a first set of address mappings of the public IP address and the subset of the NAT ports, wherein a respective device of the distributed switch maintains address mappings of a corresponding subset of the NAT ports;

generate a first mapping between a first private IP address of a user device and a first protocol port and the public IP address and a first NAT port from the subset of the NAT ports, wherein the first mapping is in the first set of address mappings;

receive a packet destined to the public IP address and the first NAT port from a second computer system of the distributed switch based on a forwarding rule indicating that the subset of the NAT ports is allocated to the computer system;

replace, using the NAT instance, the public IP address with the first private IP address and the first NAT port with the first protocol port in the packet based on the first mapping; and forward the packet to the user device based on the first private IP address.

20. The computer system of claim 19, wherein the instructions when executed by the one or more processing resources cause the computer system to:

determine that a number of allocated NAT ports from the subset of the NAT ports has reached a threshold; and receive information indicating allocation of an updated subset of the NAT ports, wherein the updated subset corresponds to an updated number of NAT sessions associated with the computer system.

* * * * *